(12) United States Patent
Nichols et al.

(10) Patent No.: US 12,056,117 B2
(45) Date of Patent: *Aug. 6, 2024

(54) APPLIED ARTIFICIAL INTELLIGENCE TECHNOLOGY FOR NATURAL LANGUAGE GENERATION USING A STORY GRAPH AND DIFFERENT STRUCTURERS

(71) Applicant: Salesforce, Inc., San Francisco, CA (US)

(72) Inventors: Nathan Drew Nichols, Chicago, IL (US); Nathan William Krapf, Chicago, IL (US); Brendan Robert Gimby, Park City, UT (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,596

(22) Filed: May 20, 2022

(65) Prior Publication Data
US 2024/0143582 A1    May 2, 2024

Related U.S. Application Data

(60) Provisional application No. 63/192,396, filed on May 24, 2021.

(51) Int. Cl.
*G06F 16/242* (2019.01)
(52) U.S. Cl.
CPC .................. *G06F 16/243* (2019.01)
(58) Field of Classification Search
CPC ..................................... G06F 16/243
USPC .......................................... 707/760
See application file for complete search history.

(56) References Cited

U.S. PATENT DOCUMENTS

| | | |
|---|---|---|
| 8,355,903 B1 | 1/2013 | Birnbaum et al. |
| 8,374,848 B1 | 2/2013 | Birnbaum et al. |
| 8,630,844 B1 | 1/2014 | Nichols et al. |
| 8,688,434 B1 | 4/2014 | Birnbaum et al. |
| 8,775,161 B1 | 7/2014 | Nichols et al. |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 9,208,147 B1 | 12/2015 | Nichols et al. |
| 9,251,134 B2 | 2/2016 | Birnbaum et al. |
| 9,268,774 B2 * | 2/2016 | Kim ............ G11B 27/034 |
| 9,396,168 B2 | 7/2016 | Birnbaum et al. |
| 9,576,009 B1 | 2/2017 | Hammond et al. |
| 9,697,178 B1 | 7/2017 | Nichols et al. |
| 9,697,197 B1 | 7/2017 | Birnbaum et al. |

(Continued)

*Primary Examiner* — Cam Linh T Nguyen
(74) *Attorney, Agent, or Firm* — Polygon IP, LLP

(57) ABSTRACT

Natural language generation technology is disclosed that applies artificial intelligence to structured data to determine content for expression in natural language narratives that describe the structured data. A story graph is employed, where the story graph comprises a plurality of items of content to be expressed in a natural language narrative. A processor executes code corresponding to any of a plurality of structurers that organize the items of content into different story outlines from which the natural language narratives are generated, wherein the different structurers comprise different operating rules and/or parameters that implement different strategies for organizing the items of content into the story outlines.

20 Claims, 16 Drawing Sheets

(56) References Cited

U.S. PATENT DOCUMENTS

| | | |
|---|---|---|
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,977,773 B1 | 5/2018 | Birnbaum et al. |
| 9,990,337 B2 | 6/2018 | Bimbaum et al. |
| 10,185,477 B1 | 1/2019 | Paley et al. |
| 10,482,381 B2 | 11/2019 | Nichols et al. |
| 10,489,488 B2 | 11/2019 | Birnbaum et al. |
| 10,572,606 B1 | 2/2020 | Paley et al. |
| 10,585,983 B1 | 3/2020 | Paley et al. |
| 10,657,201 B1 | 5/2020 | Nichols et al. |
| 10,699,079 B1 | 6/2020 | Paley et al. |
| 10,706,236 B1 | 7/2020 | Platt et al. |
| 10,713,442 B1 | 7/2020 | Paley et al. |
| 10,719,542 B1 | 7/2020 | Paley et al. |
| 10,747,823 B1 | 8/2020 | Birnbaum et al. |
| 10,755,042 B2 | 8/2020 | Birnbaum et al. |
| 10,755,046 B1 | 8/2020 | Lewis Meza et al. |
| 10,755,053 B1 | 8/2020 | Paley et al. |
| 10,762,304 B1 | 9/2020 | Paley et al. |
| 10,853,583 B1 | 12/2020 | Platt et al. |
| 10,943,069 B1 | 3/2021 | Paley et al. |
| 10,956,656 B2 | 3/2021 | Birnbaum et al. |
| 10,963,649 B1 | 3/2021 | Sippel et al. |
| 10,990,767 B1 | 4/2021 | Smathers et al. |
| 11,003,866 B1 | 5/2021 | Sippel et al. |
| 11,023,689 B1 | 6/2021 | Sippel et al. |
| 11,030,408 B1 | 6/2021 | Lewis Meza et al. |
| 11,042,708 B1 | 6/2021 | Pham et al. |
| 11,042,709 B1 | 6/2021 | Pham et al. |
| 11,042,713 B1 | 6/2021 | Platt et al. |
| 11,068,661 B1 | 7/2021 | Nichols et al. |
| 11,126,798 B1 | 9/2021 | Lewis Meza et al. |
| 11,144,838 B1 | 10/2021 | Platt et al. |
| 11,170,038 B1 | 11/2021 | Platt et al. |
| 11,182,556 B1 | 11/2021 | Lewis Meza et al. |
| 11,188,588 B1 | 11/2021 | Platt et al. |
| 11,222,184 B1 | 1/2022 | Platt et al. |
| 11,232,268 B1 | 1/2022 | Platt et al. |
| 11,232,270 B1 | 1/2022 | Platt et al. |
| 11,238,090 B1 | 2/2022 | Platt et al. |
| 11,288,328 B2 | 3/2022 | Bimbaum et al. |
| 11,303,976 B2 * | 4/2022 | Chappell, III ..... H04N 21/8541 |
| 11,334,726 B1 | 5/2022 | Platt et al. |
| 11,341,330 B1 | 5/2022 | Smathers et al. |
| 11,341,338 B1 | 5/2022 | Platt et al. |
| 11,475,076 B2 | 10/2022 | Bimbaum et al. |
| 11,501,220 B2 | 11/2022 | Birnbaum et al. |
| 11,521,079 B2 | 12/2022 | Nichols et al. |
| 11,561,684 B1 | 1/2023 | Paley et al. |
| 11,561,986 B1 | 1/2023 | Sippel et al. |
| 11,562,146 B2 | 1/2023 | Paley et al. |
| 11,568,148 B1 | 1/2023 | Nichols et al. |
| 2013/0144606 A1 | 6/2013 | Birnbaum et al. |
| 2013/0145242 A1 | 6/2013 | Birnbaum et al. |
| 2015/0242384 A1* | 8/2015 | Reiter ................... G06T 11/206 |
| | | 715/202 |
| 2016/0086084 A1 | 3/2016 | Nichols et al. |
| 2016/0162445 A1 | 6/2016 | Birnbaum et al. |
| 2016/0328365 A1 | 11/2016 | Birnbaum et al. |
| 2017/0344518 A1 | 11/2017 | Birnbaum et al. |
| 2018/0024989 A1* | 1/2018 | Bharti ..................... G06F 40/35 |
| | | 704/9 |
| 2018/0260380 A1 | 9/2018 | Birnbaum et al. |
| 2018/0285324 A1 | 10/2018 | Birnbaum et al. |
| 2019/0213254 A1* | 7/2019 | Ray ........................ G06N 3/045 |
| 2019/0340245 A1* | 11/2019 | Zhu ...................... G06F 40/295 |
| 2020/0041289 A1* | 2/2020 | Mokhnatkina ......... G06Q 30/02 |
| 2020/0082276 A1 | 3/2020 | Nichols et al. |
| 2020/0089735 A1 | 3/2020 | Birnbaum et al. |
| 2020/0134037 A1* | 4/2020 | Mankovskii ............ G06F 40/44 |
| 2020/0234178 A1* | 7/2020 | Florez Choque ...... G06N 3/045 |
| 2020/0279072 A1 | 9/2020 | Nichols et al. |
| 2020/0334299 A1 | 10/2020 | Birnbaum et al. |
| 2020/0334300 A1 | 10/2020 | Birnbaum et al. |
| 2020/0334418 A1 | 10/2020 | Platt et al. |
| 2020/0387666 A1 | 12/2020 | Birnbaum et al. |
| 2020/0401770 A1 | 12/2020 | Paley et al. |
| 2021/0097062 A1* | 4/2021 | Mishra ................... G06N 20/00 |
| 2021/0183381 A1* | 6/2021 | Petri ..................... G06F 3/0484 |
| 2021/0192132 A1 | 6/2021 | Birnbaum et al. |
| 2021/0192144 A1 | 6/2021 | Paley et al. |
| 2021/0271824 A1 | 9/2021 | Pham et al. |
| 2022/0114206 A1 | 4/2022 | Platt et al. |
| 2022/0237228 A1* | 7/2022 | Xu ...................... G06F 16/2474 |
| 2022/0237389 A1* | 7/2022 | Dognin ..................... G06N 5/02 |
| 2022/0284195 A1 | 9/2022 | Platt et al. |
| 2022/0335089 A1* | 10/2022 | Rose ....................... G06F 40/40 |
| 2022/0366331 A1* | 11/2022 | Prathap .............. G06Q 10/0633 |
| 2023/0027421 A1 | 1/2023 | Birnbaum et al. |
| 2023/0053724 A1 | 2/2023 | Birnbaum et al. |

* cited by examiner

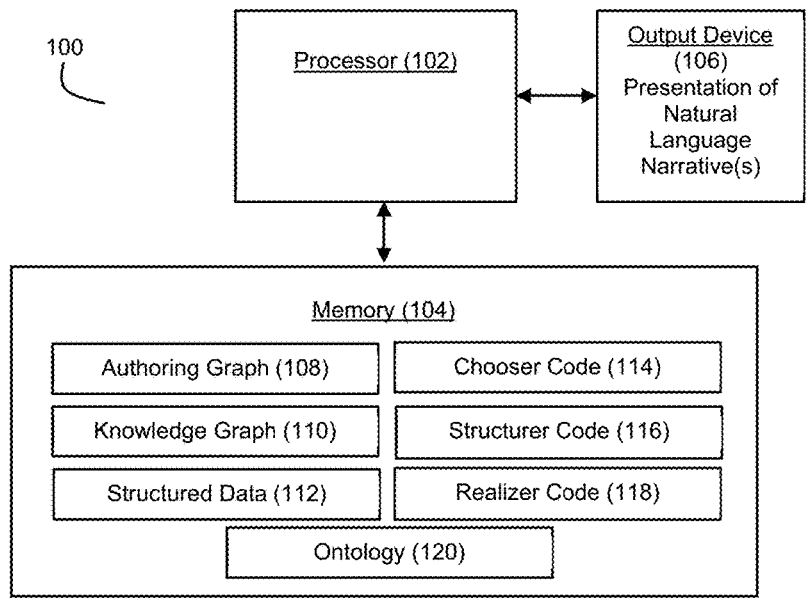
Figure 1
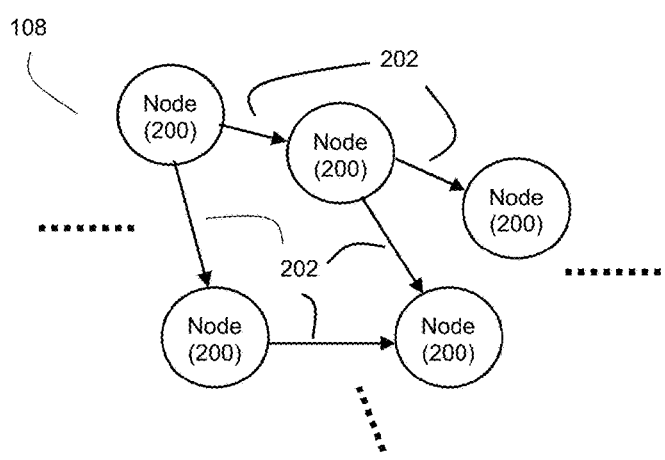
Figure 2A
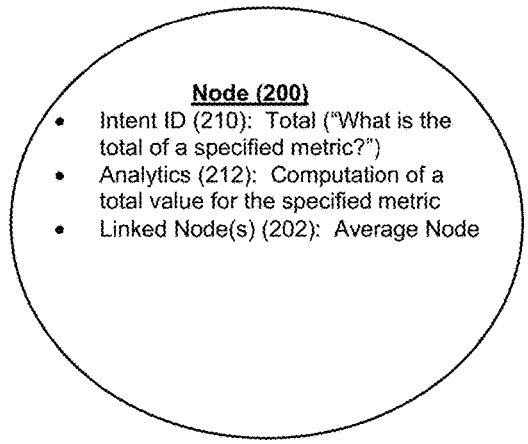
Figure 2B
Figure 2C

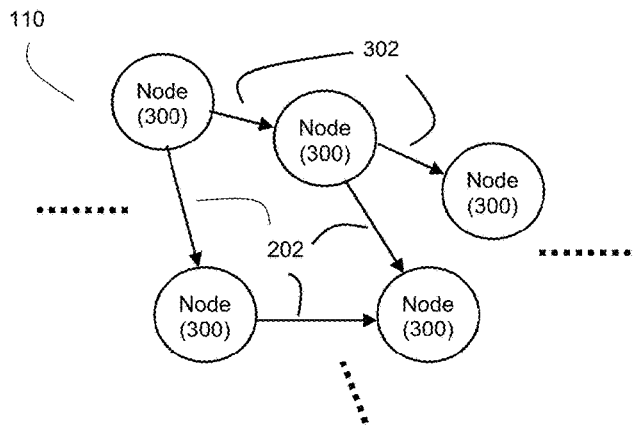
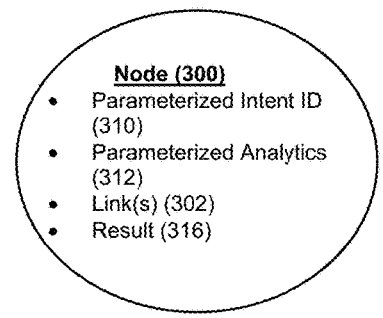
Figure 3B
Figure 3A
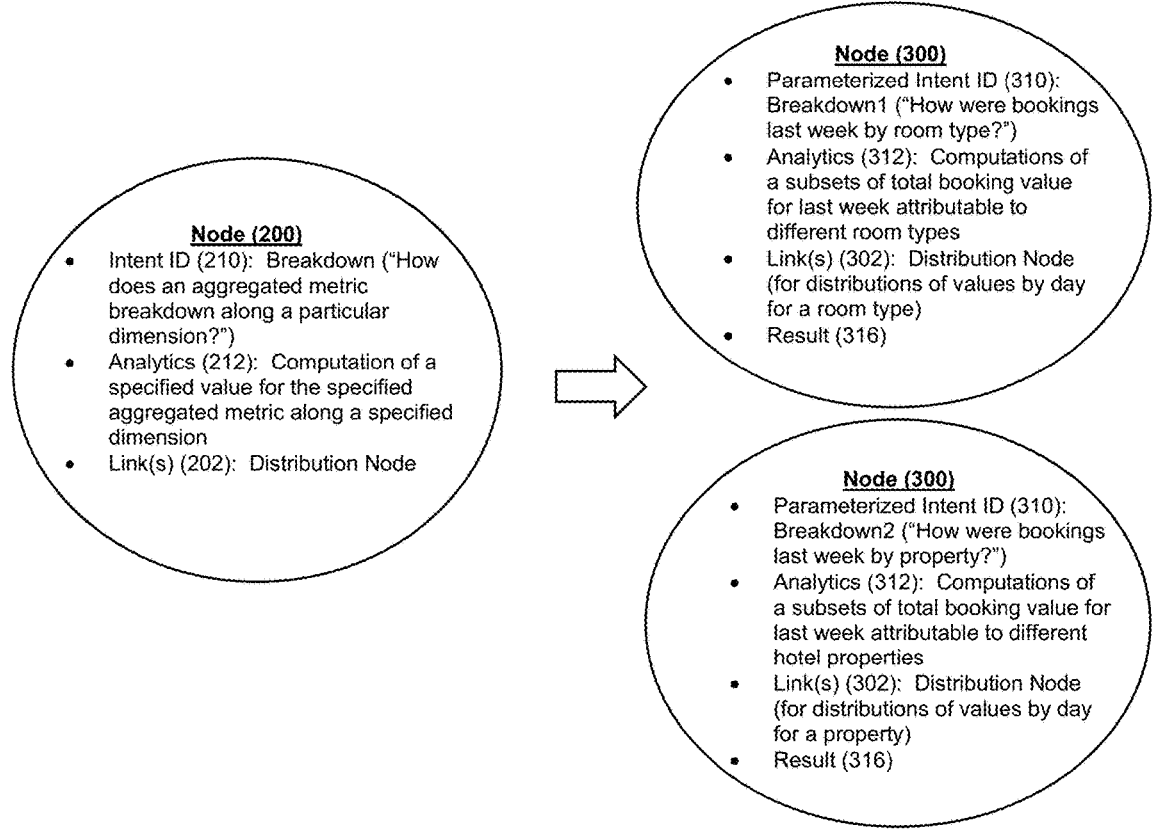
Figure 3C

Step 0: Chooser begins with a single node in the knowledge graph and a target "size" for the narrative (a story size of 3 in this example)

Story Size: 0/3

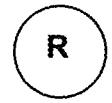

Figure 7A

Step 1: Chooser tells the node to evaluate. This executes the analytics associated with the node (with respect to the structured data) and generates the result (answer), which may include characterizations of the structured data. This also provides links to other relevant nodes in the knowledge graph Story Size: 0/3

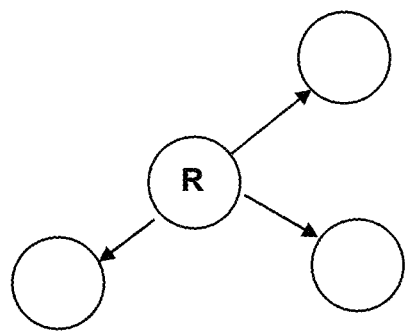

Figure 7B

Step 2: Chooser looks at the result (answer) of the evaluated node and decides whether or not to express it. In this example, the result (answer) is to be expressed, so it gets counted against the story size.

Story Size: 1/3

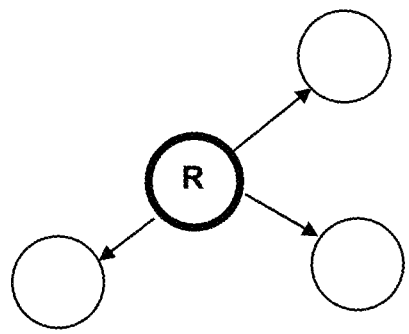

Figure 7C

Step 3: Chooser then chooses which additional nodes are to be evaluated. The chooser can make this decision in a variety of ways, but links between nodes in the knowledge graph can be leveraged to choose these additional nodes.

Story Size: 1/3

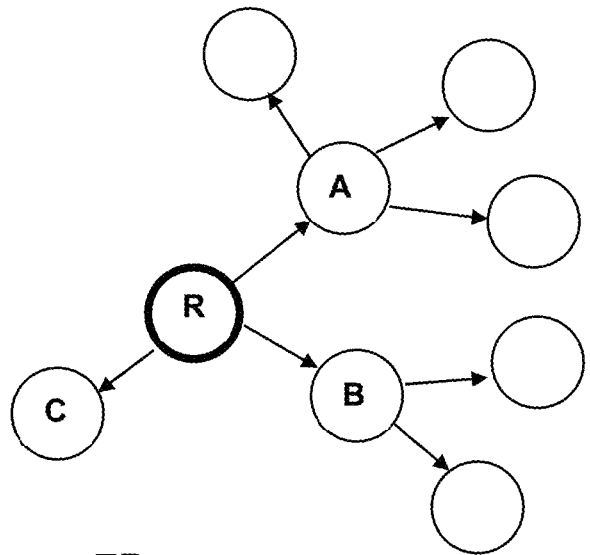

Figure 7D

Step n: The Chooser recurses and continues running the same steps until the target story size is reached.

That is, the chooser continues to evaluate the additional chosen nodes and determine whether to express its results (answers), and then choosing additional nodes for evaluation until the story size is reached.

In this view, one of the answers for the additional evaluated nodes is to be expressed in the narrative Story Size: 2/3

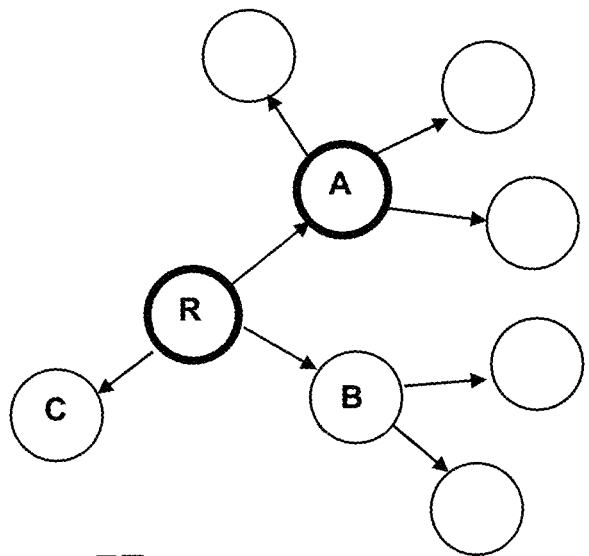

Figure 7E

Step n: In this part of the recursion, an additional node (linked to the node that produced a result (answer) to be expressed in the narrative) is chosen for evaluation.

Story Size: 2/3

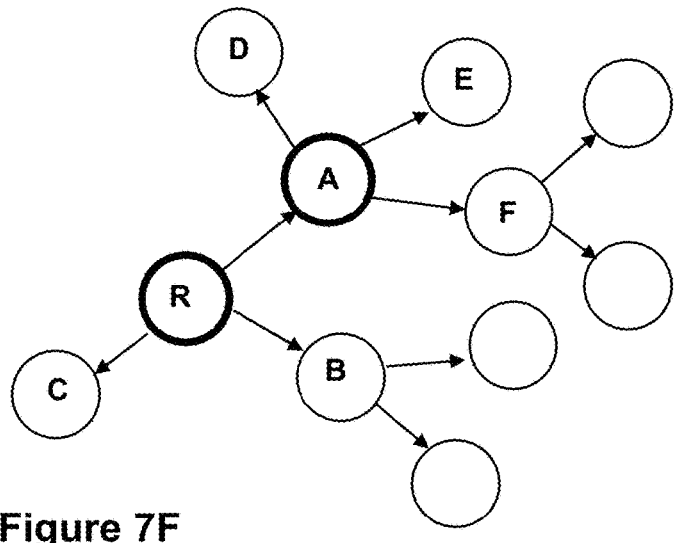

Figure 7F

Step n: In this part of the recursion, the result (answer) from the newly evaluated node is selected for expression in the narrative. This results in the story size being reached.

Story Size: 3/3

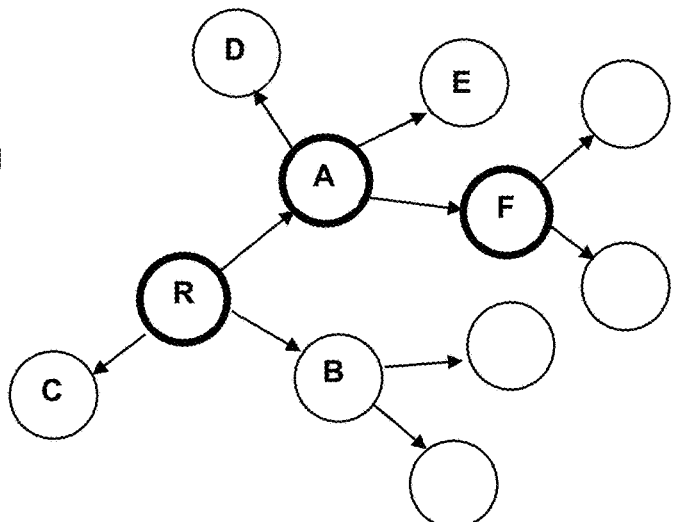

Figure 7G

Final Step: Once the target size is reached, a story graph that includes the results (answers) which have been selected for expression is passed to the Structurer Story Size: 3/3

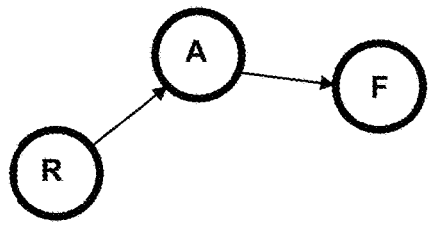

Figure 7H

The nodes which are linked to the nodes used for the story graph represent relevant additional information that the system could reasonably have included in the narrative but chose not to.

The system can provide users with access to the additional information available from these linked nodes in any of a variety of ways. For example, the additional information can be provided as responses to explicit follow-up questions (e.g., shown to the side of the main narrative) or as "hover over" information displayed in the main narrative.

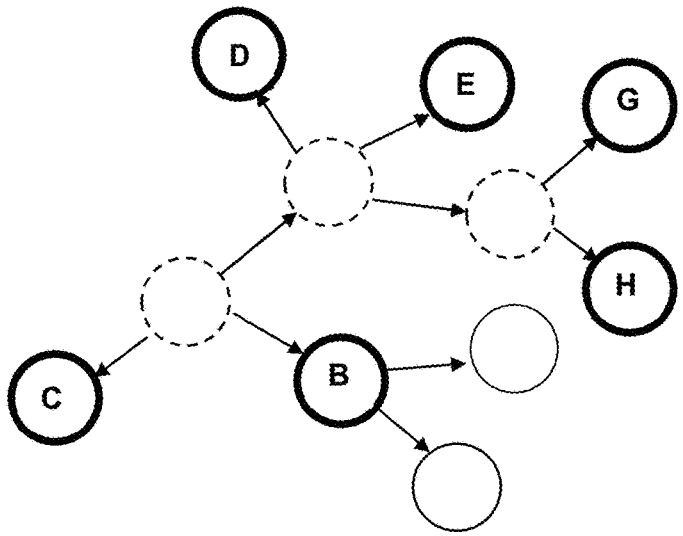

Figure 7I

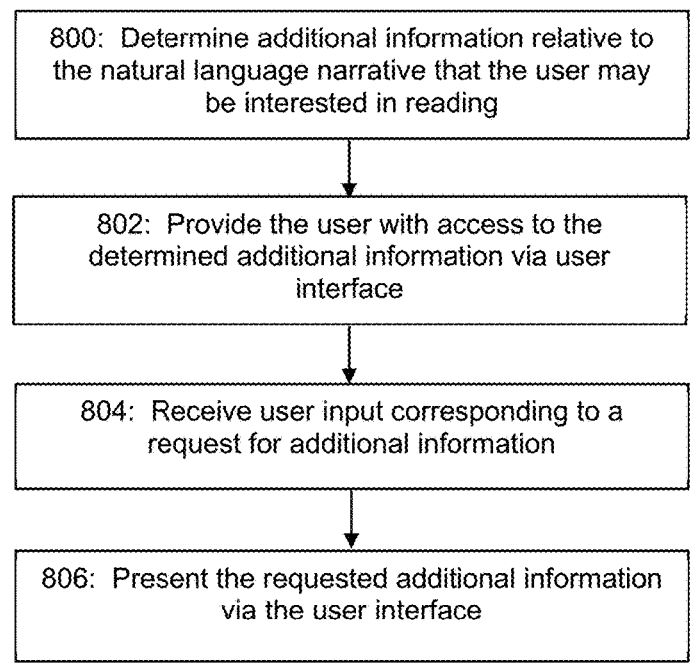

Figure 8

APPLIED ARTIFICIAL INTELLIGENCE TECHNOLOGY FOR NATURAL LANGUAGE GENERATION USING A STORY GRAPH AND DIFFERENT STRUCTURERS

CROSS-REFERENCE AND PRIORITY CLAIM TO RELATED PATENT APPLICATIONS

This patent application claims priority to U.S. provisional patent application Ser. No. 63/192,396, filed May 24, 2021, and entitled "Applied Artificial Intelligence Technology for Natural Language Generation Using a Graph Data Structure", the entire disclosure of which is incorporated herein by reference.

This patent application is related to (1) U.S. patent application Ser. No. 17/749,472, filed this same day, and entitled "Applied Artificial Intelligence Technology for Natural Language Generation Using a Graph Data Structure", (2) U.S. patent application Ser. No. 17/749,484, filed this same day, and entitled "Applied Artificial Intelligence Technology for Natural Language Generation that Chooses Content for Expression in Narratives Using a Graph Data Structure", (3) U.S. patent application Ser. No. 17/749,497, filed this same day, and entitled "Applied Artificial Intelligence Technology for Natural Language Generation Using a Graph Data Structure to Generate Narratives of Dynamically Determined Sizes", (4) U.S. patent application Ser. No. 17/749,518, filed this same day, and entitled "Applied Artificial Intelligence Technology for Natural Language Generation Using a Graph Data Structure in Combination with Chooser Code, Structurer Code, and Realizer Code", (5) U.S. patent application Ser. No. 17/749,532, filed this same day, and entitled "Applied Artificial Intelligence Technology for Natural Language Generation Using a Graph Data Structure and Configurable Chooser Code", (6) U.S. patent application Ser. No. 17/749,546, filed this same day, and entitled "Applied Artificial Intelligence Technology for Natural Language Generation Using a Graph Data Structure and Different Choosers", (7) U.S. patent application Ser. No. 17/749,561, filed this same day, and entitled "Applied Artificial Intelligence Technology for Natural Language Generation Using a Graph Data Structure with Follow-Up Capabilities", and (8) U.S. patent application Ser. No. 17/749,578, filed this same day, and entitled "Applied Artificial Intelligence Technology for Natural Language Generation Using a Story Graph and Configurable Structurer Code", the entire disclosures of each of which are incorporated herein by reference.

INTRODUCTION

There is an ever-growing need in the art for improved natural language generation (NLG) technology. NLG is a subfield of artificial intelligence (AI) concerned with technology that produces language as output on the basis of some input information or structure (e.g., where the input constitutes data about a situation to be analyzed and expressed in natural language).

The flexibility and scalability of NLG systems represent a significant technical challenge as there is a desire in the art for an ability to use a common NLG platform with different data sets across multiple domains while still accommodating a capability to fine-tune the NLG operations in any given use case.

In an effort to improve flexibility and scalability in this regard, the inventors disclose the use of a graph data structure that provides a mechanism for cohesively organizing the different intents that can be addressed by the NLG system. An intent represents an informational goal that can be sought by a user and which can be satisfied by a computer system, and it can be represented within the computer system by a set of requirements for the computer system to create the information that would satisfy the informational goal. In an example embodiment, the intents can be characterized as questions on particular topics that the NLG system is capable of answering. These questions can be parameterizable. For example, an intent can be expressed as a parameterizable question such as "how was [metric] in [timeframe]?", where [metric] and [timeframe] are tokens that can be parameterized to a defined context. The graph data structure can encapsulate different intents as different nodes in the graph data structure. Each node can serve as a manifestation of a different corresponding intent within a computer system, and the various nodes can be linked with each other based on which nodes correspond to intents that are deemed to relate to each other in a cohesive manner. Thus, if Intent B is a natural follow-up topic that a user would be interested in reading after reading about Intent A, then the node for Intent B can be linked to the node for Intent A. For example, if Intent A was represented by the parameterizable question of "How was [metric] in [timeframe]?", then Intent B could be the parameterizable question of "How is [metric] projected in [ongoing or future timeframe]?". Through the relationships defined by the links between nodes, the graph data structure serves as a library of connected questions or topics that the NLG system is capable of addressing.

Moreover, each node can be associated with corresponding analytics that can be executed to evaluate a given intent with respect to a data set. Accordingly, the graph data structure provides a common structure that can be adjusted and improved to configure the NLG system with an effective capability for meeting a user's need for information. For example, the NLG system can traverse the graph data structure in response to a question or other request from a user to determine one or more intents that are responsive to the user's question or request, and then execute the analytics corresponding to the one or more intents with respect to a data set to generate one or more results or answers that are responsive to the question or request. These results/answers serve as items of content that can be expressed in a natural language narrative that is responsive to the question/request.

A version of the graph data structure that is not particularized to any specific data set can be referred to as an authoring graph. The authoring graph can be parameterized to a particular data set to yield a knowledge graph. The inventors disclose a number of techniques for using such graphs to generate natural language narratives, including interactive narrative generation in response to user requests.

The inventors also disclose that the use of the graph data structure permits the code used to generate the actual natural language narratives be decoupled from the underlying details of the intents, and this code (which can be referred to as chooser code) can instead focus on how to best choose which intents should be used to generate content for a narrative and how such content can be best organized for expression in the narrative. After traversing the graph data structure and evaluating which of the nodes to use for items of content to be expressed in a narrative, the chooser code can generate a story graph that identifies these items of content. The chooser code can be designed as plug-in code that modularly works with the graph data structure and other components of the NLG system. Moreover, the chooser code can be configurable to adapt the strategies it uses for choosing which items of content should be expressed in a narrative. Further still, the NLG system can support the use of multiple instances of chooser code, each operating according to its own choosing strategy, so that different narratives can be generated for consumption in different contexts. As an example, different instances of the chooser code can be trained to be user-specific so different users can read natural language narratives that are tailored to their information needs and desires.

The inventors also disclose the use of structurer code that operates on the story graphs produced by chooser code to organize the content from the story graph into a story outline. Like the chooser code, the structurer code can also be designed as plug-in code that modularly works with the chooser code and other components of the NLG system. Further still, the structurer code can also be configurable to adapt the strategies it uses for organizing the content from story graphs into story outlines. Further still, the NLG system can support the use of multiple instances of structurer code, each operating according to its own organization strategy.

Realizer code can then perform NLG on the story outline to generate the natural language response that expresses the content determined by the chooser code in accordance with the organizational structure determined by the structurer code. Like the chooser code and the structurer code, the realizer code can also be designed as plug-in code that modularly works with the structurer code and other components of the NLG system.

The inventors also disclose that the computer system can leverage the graph data structure to generate narratives with parameterizable sizes. By parameterizing the size for the narrative that is to be generated, the size of the generated narrative can be determined dynamically each time a narrative is to be generated. For example, the user can define a desired size for each narrative. As another example, the size for the narrative can be determined as a result of an analysis of the underlying data set or other criteria. In this fashion, the same graph data structure can be used to create a single sentence narrative as well as a 10-page narrative.

Another powerful capability that is enabled by the graph data structure is the ability to readily identify additional information that a user may be interested in consuming as a follow-up to a generated natural language narrative. Due to the knowledge of which nodes of the graph data structure are used to generate content expressed in the natural language narrative, the NLG system can quickly identify the natural topics for follow-up information based on the links between the nodes in the graph data structure. For example, consider a graph data structure that exhibits the following linkage of nodes:

A-B-C-D

If a given narrative expresses content derived from Nodes B and C, then Nodes A and D can be considered the basis for follow-up content that can be presented to the user as they are (according to the graph data structure) natural outgrowths from a narrative derived from Nodes B and C. For example, the NLG system may respond to a follow-up question from a user that asks for additional detail about the content corresponding to Node C by presenting content derived from Node D because Node D corresponds to a topic that is deemed by the graph data structure to be a natural extension of the topic addressed by Node C. Similarly, the NLG system may respond to a follow-up question from a user that asks for more context about the content corresponding to Node B by presenting content derived from Node A.

Accordingly, with the various example embodiments described herein, the NLG system exhibits a number of technical advantages over conventional NLG systems.

For example, the NLG system is able to write better narratives across multiple data sets as improvements can readily be made to the graph data structure without significantly impacting the chooser code, while the chooser code and NLG system as a whole would nevertheless inherit the benefits of the improved graph data structure. Similarly, improvements can be readily made to the chooser code without significantly impacting the graph data structure and/or the structurer code, etc.

Further still, through the segregation of the graph data structure from the chooser code, structurer code, etc., the NLG system is more scalable in how the processing workload of narrative generation is distributed, which permits for modularity that can improve performance issues such as runtime latency. The segregation of the graph data structure from the chooser code can also permit the graph data structure and chooser code to be used independently of each other. For example, the graph data structure can be used to power a data exploration user interface that does not need to employ chooser code but instead provides users with an interface tool for tracing through the links of the graph data structure in a user-defined path to review topics of interest to them. The system can also track the users' interactions with a graph data structure in this manner to train how the chooser code operates.

Moreover, as noted above, the linkages within the graph data structure allow for users to navigate effectively from one narrative to another as those users desire more information about related topics. Further still, the ability to interactively address follow-up questions that users may have lends itself to generating narratives in response to conversational interactions with the user.

Furthermore, the NLG system described herein is readily trainable to adjust and fine-tune its operations over time, which provides a learning capability by which the NLG system evolves to generate better narratives over time.

These and other features and advantages of example embodiments of the invention are described in greater detail below.

BRIEF DESCRIPTION OF THE DRAWINGS

FIG. 1 shows a computer system for narrative generation in accordance with an example embodiment.

FIGS. 2A-2C show aspects of an example authoring graph.

FIGS. 3A-3C show aspects of an example knowledge graph.

FIGS. 7A-7I show examples of how the chooser can traverse through a knowledge graph to determine content for inclusion in a narrative and how to identify additional related information that can be presented to a user as follow-up information with respect to a narrative.

FIG. 8 shows an example process flow for providing users with relevant follow-up information relating to a narrative.

DETAILED DESCRIPTION OF EXAMPLE EMBODIMENTS

Figure 4A:
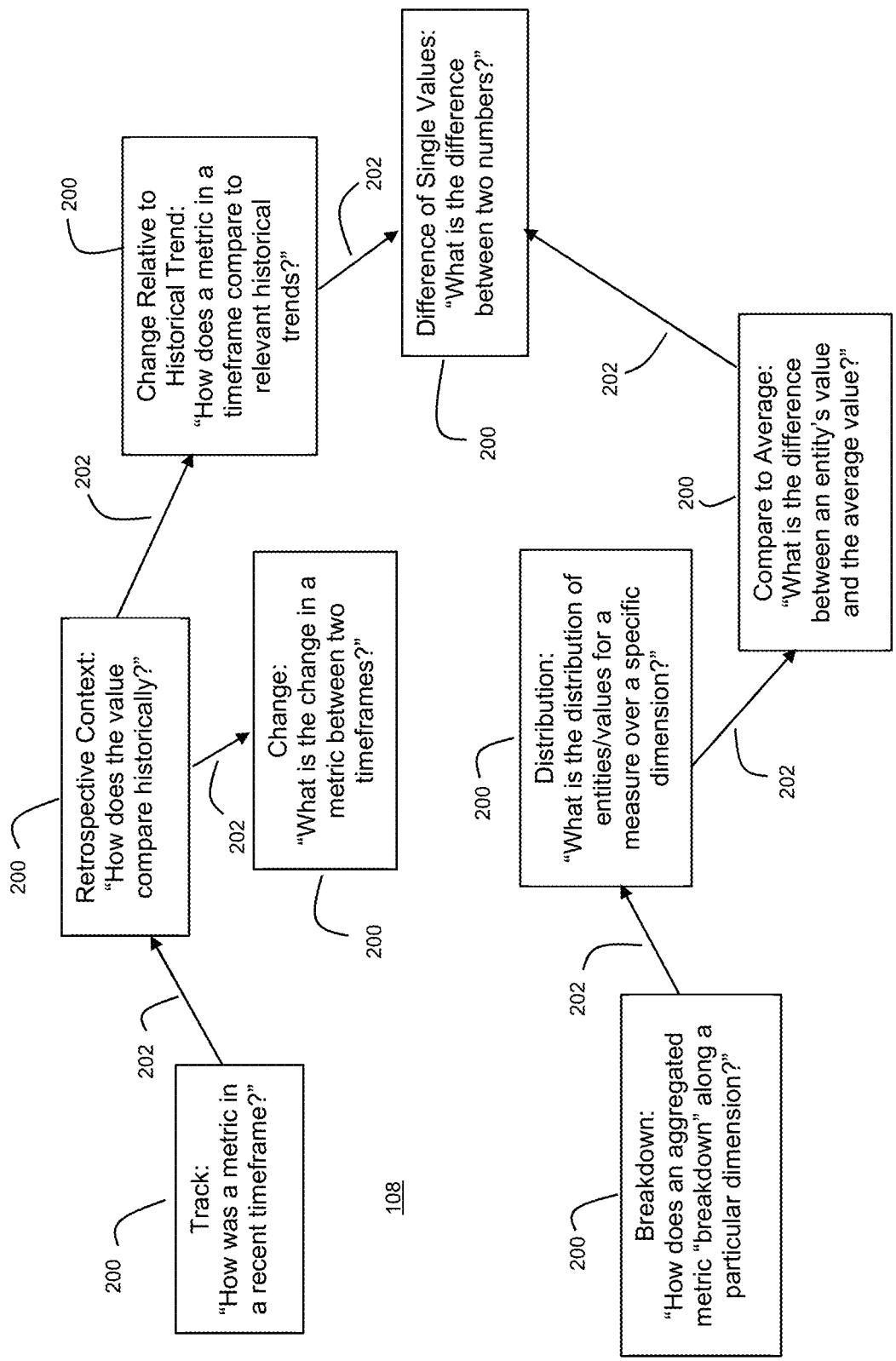
FIG. 4A shows a portion of an example authoring graph.

FIG. 1 shows an example computer system 100 in accordance with an example embodiment. The computer system 100 may comprise a processor 102 and memory 104 that cooperate with each other to perform natural language generation (NLG) on structured data to generate natural language narratives as described herein. The generated natural language narratives can be presented to users via one or more output devices 106. In this regard, computer system 100 can also be referred to as an NLG system 100.

The computer system 100 comprises one or more processors 102 and associated memories 104 that cooperate together to implement the operations discussed herein. The one or more processors 102 may comprise general-purpose processors (e.g., a single-core or multi-core microprocessor), special-purpose processors (e.g., an application-specific integrated circuit or digital-signal processor), programmable-logic devices (e.g., a field programmable gate array), etc. or any combination thereof that are suitable for carrying out the operations described herein. The associated memories 104 may comprise one or more non-transitory computer-readable storage mediums, such as volatile storage mediums (e.g., random access memory, registers, and/or cache(s)) and/or non-volatile storage mediums (e.g., read-only memory, a hard-disk drive, a solid-state drive, flash memory, and/or an optical-storage device). The memory 104 may also be integrated in whole or in part with other components of the system 100. Further, the memory 104 may be local to the processor(s) 102, although it should be understood that the memory 104 (or portions of the memory 104) could be remote from the processor(s) 102, in which case the processor(s) 102 may access such remote memory 104 through a network interface. For example, the system 100 (including the processor(s) 102 and memory(ies) 104) can take the form of a distributed computing architecture if desired by a practitioner. The memory 104 may store code (e.g., software programs or instructions) for execution by the processor(s) 102 during operation of the system 100. Such code can take the form of a plurality of instructions configured for execution by processor(s) 102. The memory 104 may also include one or more databases, file systems, and/or other suitable storage systems for storing source data, project data, and/or session data used by and/or generated by the system 100. It should also be understood that the computer system 100 may include additional or different components if desired by a practitioner.

The output device(s) 106 through which the narratives are presented to users can take any of a number of forms. For example, the output device(s) 106 can be a screen, monitor, or other visual display device through which the generated narratives are visually presented to one or more users via one or more graphical user interfaces (GUI(s)). As another example, the output device(s) can be a speaker that audibly presents the generated narratives to one or more users. It should be understood that the output device(s) 106 may be local to or remote from the processor 102. As a remote connection example, the GUI(s) displayed by a screen can be presented on a client machine that accesses the data generated by processor 102 via a network connection (e.g., over the Internet). The client machine could take the form of a desktop computer, smart phone, tablet computer, laptop computer, or other device capable of interacting with processor 102 to display natural language narratives as discussed herein. As another remote connection example, the output device 106 can be an Alexa or similar smart speaker device (which may or may not include a touchscreen GUI) that interacts with users via audible sound. Thus, in example embodiments, users can consume the natural language narratives produced by system 100 by reading and/or hearing them.

The memory 104 can store an authoring graph 108, where authoring graph 108 can take the form of one or more data structures resident in memory 104. The authoring graph 108 organizes a plurality of different intents for the NLG system. As noted above, the intents represent informational goals that can be sought by users and which can be satisfied by a computer system, and the intents can be represented within the computer system by corresponding sets of requirements for the computer system to create the information that would satisfy the informational goals. In an example embodiment, the intents can be characterized as questions on particular topics that the system 100 is capable of answering. In this regard, an intent can be a representation of an informational goal that the system 100 is capable of addressing. For example, a "Track" intent can correspond to an informational goal of tracking a metric in a timeframe. As another example, a "retrospective context" intent can correspond to an informational goal of comparing the values of a metric with a historical reference. As yet another example, a "change" intent can correspond to an informational goal of quantifying a change in a metric between two timeframes. Additional examples of informational goals which can serve as intents to achieve communication goals are described in (1) U.S. Pat. Nos. 9,576,009, 10,762,304, 10,943,069, and 11,068,661, the entire disclosures of each of which are incorporated herein by reference and (2) U.S. patent application Ser. No. 16/183,270 (filed Nov. 7, 2018 and entitled "Applied Artificial Intelligence Technology for Narrative Generation Based on Explanation Communication Goals"), the entire disclosure of which is incorporated herein by reference.

These intents can be arranged in the authoring graph 108 as a plurality of nodes 200 that are interrelated via a plurality of links 202 as shown by the example of FIG. 2A. Through the relationships defined by the links 202 between nodes 200, the authoring graph 108 serves as a library of connected questions or topics that the system 100 is capable of addressing.

FIG. 2B shows an example node 200 for an authoring graph 108. Each node 200 represents its corresponding intent and serves as its own atomic thing in the authoring graph 108. In this fashion, the different nodes 200 of the authoring graph represent a plurality of different corresponding intents.

In the example of FIG. 2B, the node 200 comprises a node or intent identifier 210 that serves to identify the particular node and its corresponding intent within the authoring graph 108.

The node 200 can also specify corresponding analytics 212 for execution by the processor 102 to evaluate the intent with respect to a data set such as structured data 112. These analytics 212 can be parameterizable to permit their re-use across a variety of different domains. For example, the analytics 212 associated with a "change" intent can include code configured to quantify a change in value for a specified metric (e.g., an attribute of an entity) between two specified timeframes. The analytics 212 can specify the parameters that are needed for the node's intent to be evaluated. These parameters can then be linked to corresponding parameters in a data set to parameterize the analytics 212 to that data set, as discussed below. The analytics 212 can also specify conditionality around which subset of a set of analytics are selected for execution in a given instance. For example, the size of the data set to be analyzed can affect which subset of the analytics 212 are to be executed. (e.g., when the data set is small, the conditions would specify that Analytics A be executed; but when the data is large, the conditions would specify that Analytics B be executed). Further still, the analytics 212 can also specify one or more characterizations to be tested against the data set as part of the intent. For example, if the relevant node/intent, as parameterized for execution, requires a distribution analysis of a sales team's booking data, the analytics 212 can also test the booking data for the sales team to determine whether any of the salespeople should be characterized as "standouts" or the like. Each characterization can be linked to one or more parameterizable applicability conditions for testing to determine whether that characterization serves as an accurate interpretation of a data set. Examples of analytics that can be used as the analytics 212 associated with intents for the nodes 200 are described in U.S. Pat. Nos. 10,963,649, 10,956,656, 10,943,069, 10,853,583, 10,762,304, 10,657, 201, and 11,068,661, the entire disclosures of each of which are incorporated herein by reference, as well as the above-referenced and incorporated '270 patent application.

It should also be understood that some nodes 200 may not include any analytics 212. Such "empty" nodes 200 would exist to collect related nodes in a "family" via linkages as discussed below. Through such linkages, the system can know that the related nodes can be kept close together in a family when organizing the narrative.

It should also be understood that the authoring graph 108 may include sets of interconnected nodes 200 that are not linked to other sets of interconnected nodes 200. In this regard, some topics addressed by nodes 200 of the authoring graph 108 may effectively serve as independent topics relative to other nodes 200.

Node 200 can also include one or more link(s) 202, as discussed above, which identify one or more related nodes. For ease of reference, a node 200 that is identified by a link 202 can be referenced as a related or linked node. Thus, these linked nodes are other nodes 200 in the authoring graph 108 which represent intents that a practitioner deems to have a relationship with the intent represented by the subject node 200. For example, if a practitioner believes that a "Retrospective Context" intent is a natural follow-up to a "Track" intent (e.g., a practitioner believes that, after getting an answer to a question about tracking a metric over a timeframe, the user may naturally want to follow-up with a question about how the values for the metric compare with a historical reference), then the practitioner can use link 202 in the "Track" node 200 to identify the node 200 that represents the "Retrospective Context" intent. In this case, the "Retrospective Context" node 200 serves as a linked node relative to the "Track" node 200 (e.g., see FIG. 4A). Likewise, the practitioner can use link 202 in the "Retrospective Context" node 200 to identify the "Track" node as a linked node relative to it if the practitioner wants a link 202 to have bi-directionality.

In an example embodiment, however, the links 202 can be uni-directional. Thus, for a simple example of an authoring graph 108 with uni-directional links 202 where the graph structure of nodes is A→B→C→D, it should be understood that (1) Node A would include a link 202 to Node B, (2) Node B would include a link 202 to Node C, and (3) Node C would include a link 202 to Node D.

In an example embodiment, a node 200 in the authoring graph 108 can also include a link 202 to itself if desired by a practitioner. This can serve as the basis for a relationship by which the authoring graph 108 can spawn a knowledge graph 110 as discussed below where linkages may exist between different parameterizations of the same unparameterized intent. Such a knowledge graph 110 can support links to follow-ups that address the same intent (but for different metrics and/or timeframes, etc.).

Through the links 202, the authoring graph 108 can define relationships among the corresponding intents of the nodes 200 and their corresponding intents. The links 202 may also include metadata that serves to annotate or describe one or more additional aspects of the nature of the relationship between the referring node and the linked node.

An example of link metadata that can be employed with one or more of the links 202 is a priority indicator that indicates which of the linked nodes are the most important to a subject node 200. For example, the priority metadata can be a rank value or a score that indicates the importance of a linked node that is connected by link 202. For example, if Node A links to Nodes B and C, the link 202 that connects Node A to Node B can be associated with priority metadata that identifies Node B as being "high" priority or the like while the link 202 that connects Node A to Node C can be associated with priority metadata that identifies Node C as being "low" priority or the like. Chooser code 114, examples of which are discussed in greater detail below, can then use the priority information in the link metadata as a hint when deciding whether any additional nodes should be evaluated or additional information expressed in a narrative (e.g. favoring higher priority linked nodes over lower priority linked nodes).

Another example of link metadata that can be employed with one or more of the links 202 is conditionality criteria. For example, some links 202 may only be valid if certain conditions are met in the underlying data or context for the system. As an example, condition metadata for a link 202 can specify something like "the link from the Track node to the Compare Against Goals node is only valid if there are specified goals for the narrative generation process". Thus, if a user has specified a goal when interacting with the system, the link 202 would connect the Track node to the Compare Against Goals node; but if not, the link 202 would be effectively disabled.

Another example of link metadata that can be employed with one or more of the links 202 is parameterization information. For example, it may be desirable to pass parameters from a given node 200 to its linked node, and the parameterization metadata can identify the parameters that are passed from one node to another. For example, a Retrospective Context node can link to a Change node. The parameters used by the Retrospective Context node can include a time frame for the context assessment. The Change node can include two time frame parameters to use for quantifying a change in a metric between two time frames. Through the parameterization metadata in link 202, the system can help ensure that when linking from the Retrospective Context node to the Change node, the proper timeframes can be used.

Another example of link metadata that can be employed with one or more of the links 202 is reason or type information. The reason or type information can describe the nature of the relationship between the linked nodes. Examples of relationships that can identified by the reason or type metadata include "establishing", "contextualizing", and "elaborating". Consider an example where Node A links with Nodes B, C, and D. The link 202 from Node A to Node B can indicate that Node B provides establishing information relative to Node A. The link 202 from Node A to Node C can indicate that Node C provides contextual information relative to Node A. The link 202 from Node A to Node C can indicate that Node C provides elaboration information relative to Node A. Chooser code 114, discussed below, can then utilize this reason or type metadata to decide an order in which linked nodes can be expressed in a narrative (e.g., expressing establishing information first, while contextualization information may be expressed after the main focus, etc.).

FIG. 2C shows a specific example of a node 200 for inclusion in the authoring graph 108, where the node 200 of FIG. 2C corresponds to a "Total" intent as reflected by its Intent ID 210. In this example, the "Total" intent focuses on the topic of what the total of a specified metric is. The associated analytics 212 for this intent can include code that sums the values for the specified metric to compute its total. The linked node for the "Total" intent can be a node for an "Average" intent (where the "Average" intent focuses on the topic of identifying the average value of the metric that had been totaled by the "Total" node). The link 202 from the "Total" node 200 to the "Average" node 200 would thus establish an understanding by the authoring graph 108 that someone interested in the total value of a metric might also be interested in the average value of the metric.

The authoring graph 108 is a generalized representation of the topics and questions that can be addressed by the system 100. As such, the authoring graph 108, while parameterizable to a data set, is unparameterized as to any particular data set. This means that the authoring graph 108 is capable of use with any of a number of data sets. When the authoring graph 108 is parameterized with respect to a given data set, it becomes the knowledge graph 110 as discussed in greater detail below. In this fashion, the authoring graph 108 can be analogized to a general "org" chart for a non-specific company (where there are slots for positions such as a CEO, COO, VP, etc. along with hierarchy of links among the positions), while the knowledge graph 110 can be analogized to the actual org chart of a specific company, where there is a specified CEO, a specified COO, and perhaps several specified VPs for different departments, etc. down the line).

FIG. 3A shows an example of a portion of a knowledge graph 110. With reference to FIG. 1, the memory 104 can store the knowledge graph 110, where knowledge graph 110 can take the form of one or more data structures resident in memory 104. Similar to the authoring graph 108, the knowledge graph 110 comprises a plurality of nodes 300 that are arranged with a plurality of links 302 between related nodes 300.

As noted above, the knowledge graph 110 differs from the authoring graph 108 in that the knowledge graph 110 is a transformation of the authoring graph 108 with respect to a particular data set. Thus, as nodes 200 of the authoring graph 108 are adapted to a particular data set, the nodes 200 are parameterized based on the data set to produce the nodes 300 of the knowledge graph 110. In this fashion, a node 300 of the knowledge graph 110 can include an Intent ID 310 that serves to identify the corresponding intent of the node 300, parameterized analytics 312 that are associated with the corresponding intent, and the one or more links 302 that identify which nodes 300 are related to the subject node 300 (see FIG. 3B). The links 302 to related nodes can be associated with the same types of link metadata discussed above for links 202. However, in an example embodiment, the knowledge graph 110 can be arranged so that nodes 300 do not include links 302 to themselves, which can avoid the potential for endless loops within the choosing process discussed below. Node 300 can also include a result 316 which represents the product of applying the parameterized analytics 312 to the subject data set that the knowledge graph 110 addresses. This result 316 can also be characterized as an "answer" to the intent and serves as an item of content that may be expressed in a natural language narrative. In an example embodiment, the nodes 300 can be populated with the results 316 on an as-needed basis when the system 100 is used to generate natural language narratives. However, it should be understood that some practitioners may choose to configure the system 100 so that it generates the results 316 for the nodes 300 in advance of a specific need for evaluation of a node 300 during a narrative generation process. This pre-computation may be useful in scenarios where a practitioner wants to reduce the latency of narrative generation from the time that a trigger is received for generating a new narrative.

In another example embodiment, the system can permit a user to override the default analytics 312 (which are a parameterization of analytics 212 of the authoring graph 108) so that the analytics 312 instead call to some other resource specified by the user (and where the node 300 then uses the output of that resource to produce the results 316). The ability to have the analytics 312 specify external resources provides users with a capability of readily using their own models for data analysis if desired.

It should be understood that the entire authoring graph 108 need not be transformed into a knowledge graph 110. The system can operate by only parameterizing portions of the authoring graph 108 that are relevant to a given narrative generation process. As an example, the system can create the nodes 300 of the knowledge graph "on the fly" from the authoring graph 108 as the system learns more about the topics that the user is interested in consuming. As another example, the system can create a number of nodes 300 of a defined link depth once the system learns an initial topic that the user is interested in. Should the system need to explore beyond the defined link depth of the knowledge graph 110, the system could then follow the links 302 as needed to create additional nodes 300 from corresponding nodes 200 of the authoring graph 108.

It should also be understood that it is possible that many knowledge graphs 110 could be generated from the same authoring graph 108. For example, different data sets would produce different knowledge graphs 110, even if derived from the same authoring graph 108. As another example, the knowledge graph 110 that is a parameterization of an authoring graph 108 based on a user request such as "How were the bookings last week" can be different than a knowledge graph 110 that is a parameterization of the authoring graph 108 based on a different user request such as "How were the bookings last month". Accordingly, the same data set can be used to parameterize the same authoring graph but with different specified time periods and thus produce different knowledge graphs 110. Similarly, a parameterization of the authoring graph 108 with respect to a request such as "How were the expenses last month" could produce still another knowledge graph 110.

Through the relationships defined by the links 302 between nodes 300, the knowledge graph 110 serves as a library of connected questions or topics that the system 100 is capable of addressing with respect to a particular data set.

FIG. 3C shows an example of how an authoring graph node 200 can be parameterized to produce nodes 300 for the knowledge graph 110. Node 200 shown by FIG. 3C corresponds to a "breakdown" intent. While authoring graph 108 would also include a Breakdown node 200, such a Breakdown node 200 would not parameterized to any particular data set. If a practitioner wants to apply the Breakdown node 200 to a data set that reflects booking data for a chain of hotels, the parameterization of the Breakdown node 200 to this data set can produce multiple nodes 300 as reflected by FIG. 3C. The different nodes 300 can correspond to breakdowns of a given aggregated metric across different dimensions, breakdowns of different aggregated metrics across a given dimension, etc. For example, a first breakdown intent node 300 can correspond to an intent that provides a breakdown of room bookings by room type (e.g., suite rooms versus rooms with two queen beds versus rooms with a single king bed, etc.), a second breakdown intent node can correspond to an intent that provides a breakdown of room bookings by hotel property (e.g., by hotel at address X, hotel at address Y, etc.), and so on for additional breakdowns that may be desired by a practitioner.

As part of the parameterization, the parameterized analytics 312 are produced by mapping variables in the general analytics 212 of node 200 to the relevant fields in the bookings data to enable computation of the desired subsets of bookings. For example, the analytics can be parameterized to know which fields of the bookings data correspond to bookings for suite rooms, which fields of the bookings data correspond to bookings for rooms with two queen beds, which fields of the bookings data correspond to bookings for rooms with a single king bed, etc. Thus, execution of the parameterized analytics 312 with respect to the relevant data set can produce the result 316 for the relevant intent.

Figure 4B:
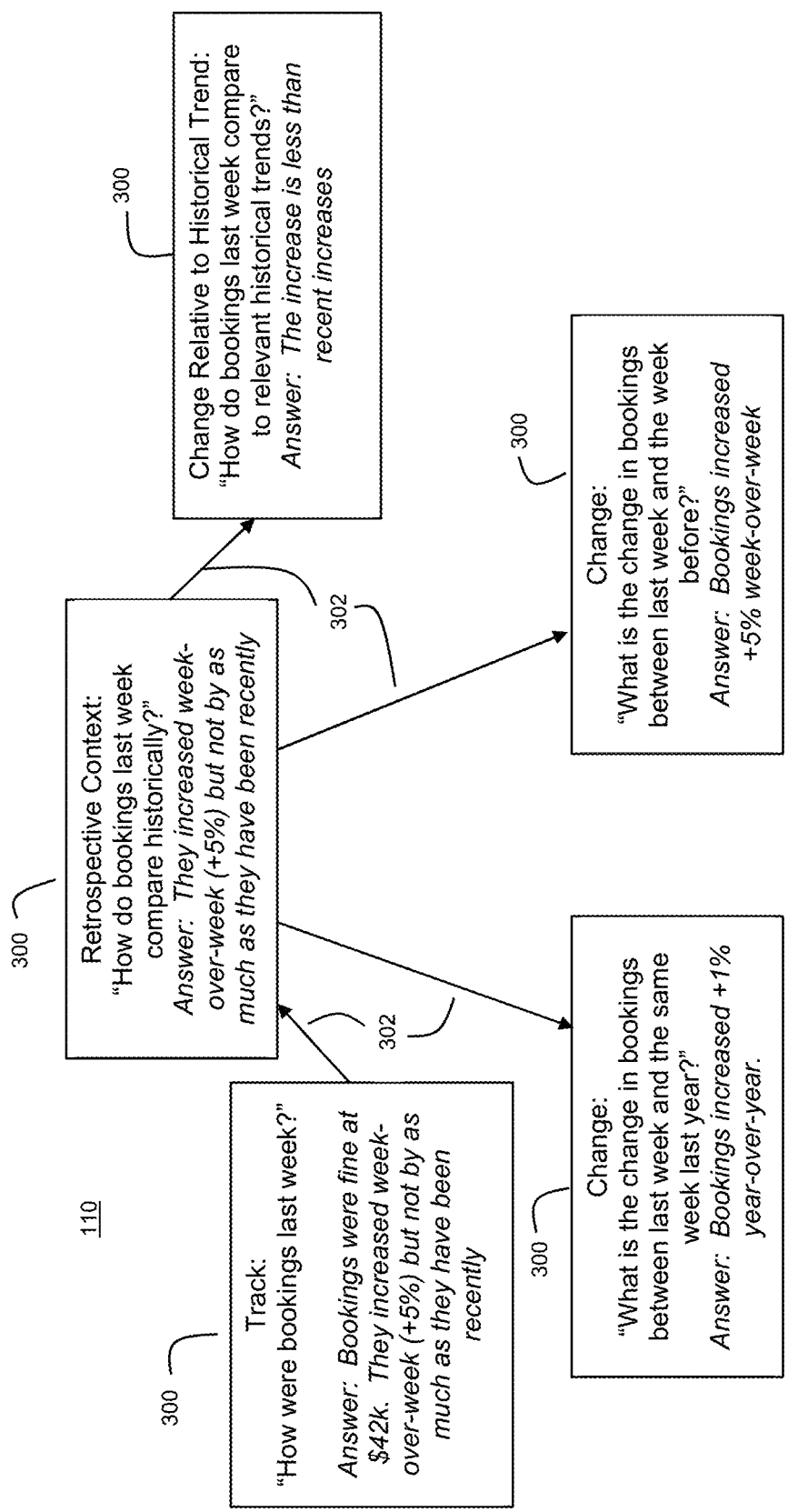
FIG. 4B shows a portion of an example knowledge graph.

FIG. 4A shows a portion of an example authoring graph 108 with multiple nodes 200 interconnected via links 202. FIG. 4B shows a portion of an example knowledge graph 110 with multiple nodes 300 interconnected via links 302, where these nodes 300 serve as parameterized versions of some of the nodes 200 of FIG. 4A (where the authoring graph 108 of FIG. 4A is parameterized with respect to a data set of bookings data to produce the knowledge graph 110 of FIG. 4B). It can be seen from FIG. 4B that the general "change" intent node of FIG. 4A was parameterized to create two distinct "change" intent nodes in FIG. 4B for the knowledge graph 110 (where the different "change" intent nodes 300 in FIG. 4B address changes in bookings over different timeframes).

It should be understood that the authoring graph 108 and/or the knowledge graph 110 can be adjustable and thus updated over time. For example, new nodes 200/300 can be added to the authoring graph 108/knowledge graph 110 over time to expand on the topics that the graphs address. Further still, the nodes 200 and/or 300 can be adjusted to change their analytics, linkages, or other features or metadata to improve their performance. For example, a practitioner might find that adjustments to the analytics 312 of a node 300 may improve the quality of result 316 that the subject node 300 produces. As another example, a practitioner might find that adjustments to the links 202 and/or 302 of the nodes 200 or 300 as applicable may improve the capabilities of the graphs 108 or 110 as applicable in cohesively linking the intents corresponding the various nodes. For example, a practitioner may find that users often ask questions about Topic Y after reading about Topic X. If the node 200/300 for an intent corresponding to Topic X does not already identify a node 200/300 for an intent corresponding to Topic Y as one of its linked nodes 202/302, then the system 100 can update the node 200/300 for Topic X to add the node 200/300 for Topic Y as one of its linked nodes 202/302. By making adjustments to individual nodes 200 and/or 300, the improvements yielded by such adjustments are effectively inherited by all connected nodes of the graph due to the linkages among the nodes. Accordingly, it should be understood that the authoring graph 108 and/or knowledge graph 110 provide practitioners with a shared source of interconnected intents that can be readily improved, used, and re-used over time in a cohesive manner. It should be understood that in an example embodiment where the knowledge graphs 110 are more transient than the authoring graph 108 (e.g., some practitioners may find it desirable to discard knowledge graphs 110 relatively soon after their use), a user may find it more desirable to update the authoring graph 108 as the authoring graph 108 will tend to be re-used significantly.

Returning to FIG. 1, the memory 104 can also store the structured data 112 that serves as the data set to be described by the natural language narratives. The structured data 112 can take the form of data in a database, data in spreadsheet files, or other structured data accessible to the processor 102. For example, the structured data can comprise data organized into a plurality of fields such as values in various rows and columns of data tables. System 100 operates to analyze this structured data 112 using the techniques described herein to generate natural language narratives about the structured data 112 that express one or more insights about the structured data 112. For example, the natural language narratives can express one or more characterizations of the structured data 112 to provide users with meaningful insights about the structured data 112. In the course of parameterizing an authoring graph 108 to generate a knowledge graph 110, various fields of the structured data 112 can be mapped to various variables and parameters of the nodes 200 to parameterize the authoring graph 108 and yield the knowledge graph 110.

Further still, the memory 104 can also store an ontology 120 that serves as a knowledge base for the domain of the system. The ontology 120 can be a data structure that identifies the types of entities that exist within the knowledge domain used by the system to generate narratives, and the ontology 120 can also identify additional characteristics relating to the entity types such as various attributes of the different entity types, relationships between entity types, and the like. Further still, the ontological objects (such as entity types, etc.) can be associated with expressions that can be leveraged by the system when the system realizes a narrative that addresses such ontological objects in natural language. Example embodiments of the ontology 120 that can be used with system 100 are described in U.S. Pat. Nos. 10,990,767, 10,963,649, 10,943,069, 10,762,304, 10,755,046, and 10,719,542, the entire disclosures of each of which are incorporated herein by reference. Thus, it should be understood that ontology 120 can provide contextual knowledge about the content of the structured data 112 by relating such data to entities, entity types, attributes, relationships, etc. as well as how such features can be expressed in natural language.

Figure 5:
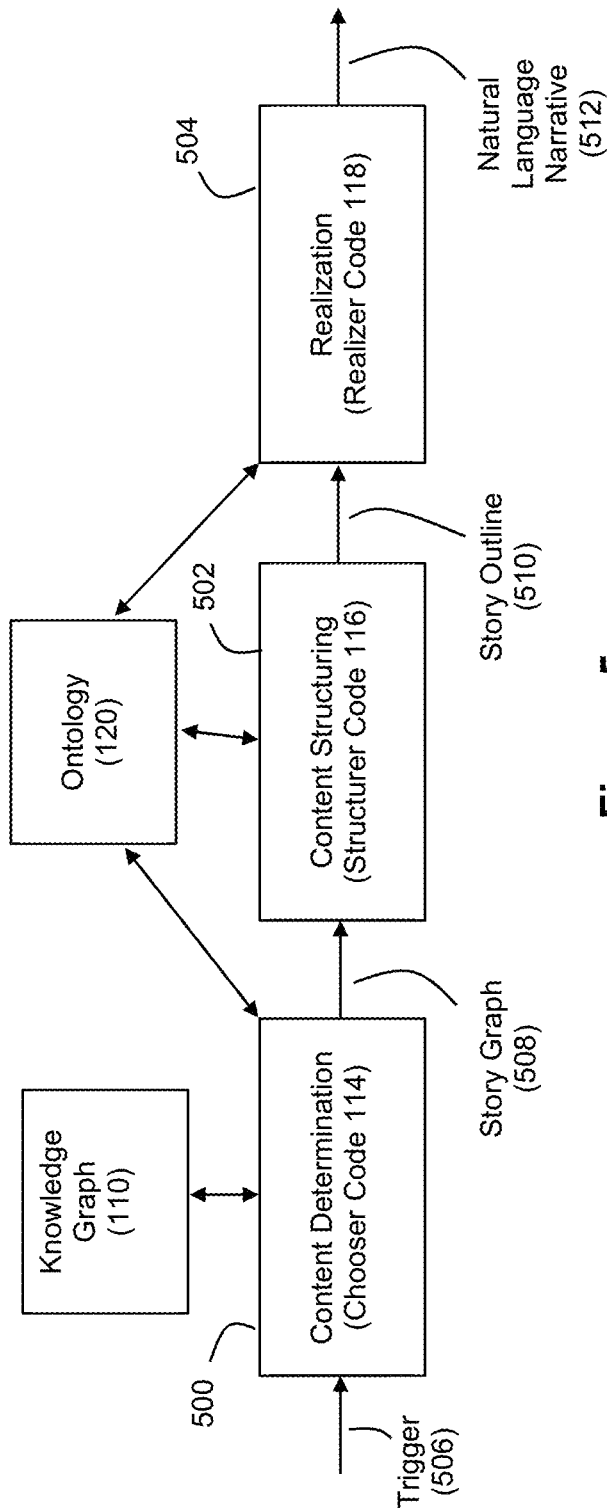
FIG. 5 shows an example process flow for narrative generation in accordance with an example embodiment.

Further still, the memory 104 can store the code for execution by processor 102. In the example of FIG. 1, this code includes chooser code 114, structurer code 116, and realizer code 118. Example embodiments of such code are discussed in greater detail below. Execution of this code by processor 102 operates to analyze the structured data 112 using the prism of the knowledge graph 110 to generate natural language narratives about the structured data 112. FIG. 5 illustrates an example process flow that explains how the code can employ three phases to generate the natural language narratives using such techniques.

In FIG. 5, the three phases of operation are a content determination phase 500, followed by a content structuring phase 502, followed by a realization phase 504.

The content determination phase 500 involves determining what content should be expressed in the narrative to be generated. This phase 500 can include operations for initializing the knowledge graph 110 from the authoring graph 108. This phase can also include selecting the chooser code 114 to be executed. Chooser code 114 performs aspects of phase 500 that operate on the knowledge graph 110 and the structured data 112 to determine which node results 316 are to be expressed in the natural language narrative. Phase 500 begins with a trigger 506, where this trigger 506 can cause an instantiation of the knowledge graph 110 from the authoring graph 108 and then cause the chooser code 114 to resolve to a particular node 300 in the knowledge graph 110. Furthermore, in example embodiment where the system includes multiple different embodiments of the chooser code 114, the trigger 506 can also cause the system to select the appropriate chooser code 114 to be executed (from among the chooser code options).

Resolving trigger 506 to a particular node 300 can be performed in any of a variety of manners.

For example, the trigger 506 can be user input. As an example of user input, the trigger 506 can be a natural language request from a user that the chooser code 114 or other component of the system 100 maps to a particular node 300 of the knowledge graph 110. Natural language processing (NLP) techniques can be applied to this natural language request to extract its meaning and determine the intent that most closely corresponds to the extracted meaning. For example, the user can express a question in natural language such as "How was the marketing spend last week", and this question can be mapped to a node 300 which corresponds to a track intent that addresses the topic of characterizing the amount of marketing spend for the timeframe corresponding to last week. U.S. Pat. No. 10,755,046, the entire disclosure of which is incorporated herein by reference, describes examples of NLP techniques that can be applied to user requests to extract meaning from them for the purpose of mapping meanings to intents. By extracting meaning from such natural language requests, the system 100 can support conversational interactivity by which the system 100 generates narratives in a conversational manner as the user asks questions of the system 100. Another example of user input for trigger 506 can be a user selection of a specific intent from a menu or the like presented to the user via a user interface (UI). For example, a drop down menu of intent options can be presented to the user to solicit a selection by the user of the topic he or she would like the system 100 to address. As yet another example, a UI can be provided that allows a user to enter a search query or the like, where this search query gets mapped to any of a number of intents using search engine techniques and/or NLP techniques. The UI can then present search results in the form of ranked search results corresponding to possibly matching intents, and the user can select the intent that he or she is interested in having the system 100 address. As still another example, the user input can be a bookmark that identifies a particular node to serve as the first node 300 to use for the content determination phase 500. Thus, if a user regularly wants to consume narratives on a particular topic, he or she can bookmark the node 300 that will serve as the jumping off point for those narratives.

As another example, the trigger 506 can be a scheduled trigger. For example, the system 100 can be configured to select a particular intent according to a defined schedule of some sort (e.g., triggering a particular node every morning at 8 am).

As another example, the trigger 506 can be a condition-based trigger. The system can define one or more conditions that are tested against data known by the system 100 to determine whether a particular node should be selected. For example, the system 100 can monitor event data to determine whether a new deal has closed. In response to detecting a deal known by the system having its status changed to "closed" or the like, the system 100 can use the satisfaction of this condition as the basis for selecting an intent that describes this deal as a recent deal. As another example, an anomaly detection and/or outlier detection can be used as a condition-based trigger. Thus, the structured data 112 can be analyzed to determine whether any anomalies or outliers are present (e.g., the structured data 112 shows that "daily unique visitors was higher than usual yesterday"), and these detected anomalies/outliers can trigger a generation of a narrative on a topic corresponding to the anomaly/outlier.

The output of the content determination phase 500 is a story graph 508. The story graph 508 comprises one or more node results 316 that are selected for expression in the natural language narrative. These node results 316 can also include the links 302 between the nodes 300 corresponding to those results 316 (as these links 302 can be leveraged in the structuring phase 502 and/or realization phase 504). In this regard, the story graph 508 can be a subset of the knowledge graph 110 that is selected for expression in the narrative.

The structurer code 116 performs the content structuring phase 502. This phase 502 operates on the story graph 110 to organize the included results 316 into a story outline 510. In doing so, the structurer code 116 arranges the included results 316 in a sequence to achieve a desired effect. For example, the sequence can determine which of the included results 316 are to be expressed first in a narrative, which of the included results 316 are to be expressed together in a sentence or paragraph, how to segueway from one included result 316 to another, etc. The structurer code 116 can be configured with rules and parameters that govern such structuring of included results 316 from the story graph 508 into the story outline 510.

The realizer code 118 performs the realization phase 504. Phase 504 applies NLG to the story outline 510 to generate the natural language that is used to express the included results 316 in the natural language narrative 512 in accordance with the story outline 510. Any of a variety of NLG techniques for converting outlines into natural language narratives can be used by the realizer code 118 for this purpose.

Each of phases 500, 502, and 504 may interact with the ontology 120 in various ways to support their operations.

For example, links 202, 302 may define conditions that care about metadata properties associated with the parameters, and these metadata properties can be provided by the ontology 120. Thus, the aspects of phase 500 that operate on the authoring graph 108 to produce the knowledge graph 110 can be influenced by the ontology 120. For example, a Track node 200 in the authoring graph 108 may have a condition on a link 202 that is "if the entity type of the metric accrues over time, then include a link in the Track node to the Total node". Thus, when those nodes 200 are parameterized to a data set to produce a node 300 for "Track revenue last week", this means the entity type of the metric is Revenue, and the ontology 120 says that Revenue accrues over time; in which case the system will link to the parameterized Total node 300 (and a revenue amount can be totaled). This in turn allows the system to produce a result 316 that can be expressed as: "Last week, total revenue was $42 k". On the other hand, when those nodes 200 are parameterized to a data set to produce a node 300 for "Track the closing stock price last week", this means the entity type of the metric is Closing Price, and the ontology 120 says that Closing Price does not accrue over time (instead, it is a discrete value in time), in which case the system does not link the Track node 300 to a node for the total intent.

The relationships between entity types that are identified by the ontology 120 can also influence conditions in the authoring graph 108. For instance, a Track node 200 can have a link 202 to itself, with conditions and parameterization strategies like "If the metric is the input to a formula, then include a link to "Tracking the output metric" node". So if the user requests "Track revenue last week", the system can, e.g., generate a follow-up question of "Track profit last week".

Phase 502 can also use ontology 120, for example by leveraging the relationships between entity types defined by the ontology 120 to support decision-making about how to order or otherwise relate different results 316 of the story graph 508 within outline 510. For example, the story graph 508 may contain results 316 or ideas such as "store revenue is flat" and "store foot traffic is up". The structuring phase 502 can decide to put those results/ideas together, and it can decide whether to combine them with a conjunctive or contrastive relationship (e.g. "Foot traffic is up and store revenue is flat" versus "Foot traffic is up but store revenue is flat") by consulting the ontology 120 to determine if there is a specified relationship between foot traffic and revenue. Thus, if the ontology 120 has a "foot traffic positively influences revenue" relationship, then structuring phase 502 can use that knowledge to identify a contrastive ("but") relationship between those results 316 in the story outline 510.

Moreover, phase 504 can extensively use ontology 120, particularly with regard to selecting how various entities and attributes present in the outline should be expressed in natural language.

Accordingly, by executing the chooser code 114, structurer code 116, and realizer code 118 using the knowledge graph 110, structured data 112, and ontology 120, the system 100 is able to generate desired natural language narratives 512 about the structured data 112.

Figure 6A:
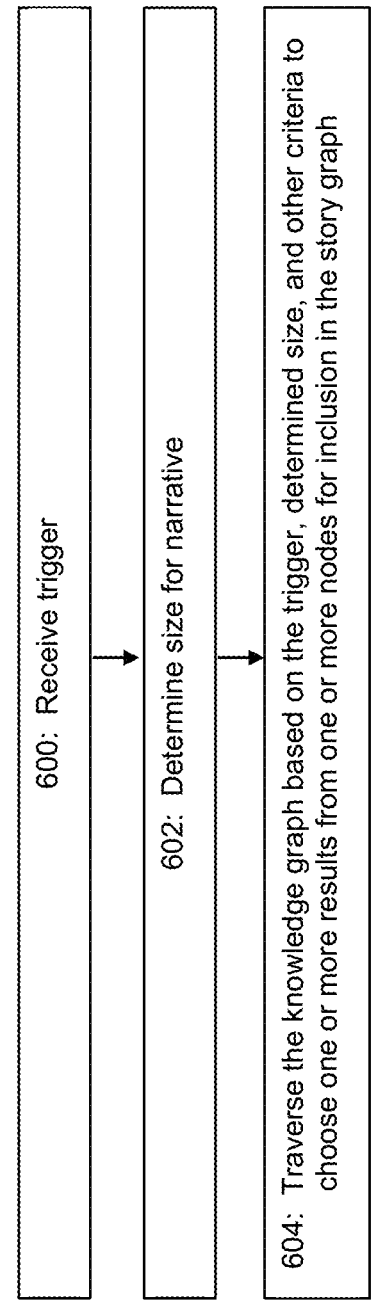
FIGS. 6A and 6B show example process flows for a chooser that determines the content to be included in a narrative.

FIG. 6A depicts an example process flow for a "chooser" embodied by the chooser code 114. At step 600, the chooser receives the trigger 506. Examples of options that can be employed for trigger 506 are discussed above.

At step 602, the chooser determines a size for the narrative to be generated. This determined size, which can also be referred to as a story size, can govern how many results 316 are to be included in the story graph 508. The "size" can be expressed using any of a number of metrics. In an example embodiment, the size can be expressed as a defined number of results 316 to be expressed in a narrative. In another example embodiment, where the results 316 may include more than one idea, the size can be expressed as a defined number of ideas. It should be understood that a result 316 may include a number of components that can be classified as different ideas (e.g. the result 316 for a Change node 300 might include an absolute change value and a percent change value, and these different values can be classified as different ideas in the same result 316); and the narrative size can thus be defined in terms of a number of ideas rather than results 316. In another example embodiment, each result 316 can be associated with an estimated number of words or characters that will be needed to express that result 316 in a narrative. The size can be expressed as a defined number of words or characters, and the chooser can determine whether the story graph 508 has reached the defined size based on an aggregation of the estimated number of words or characters that would be needed to express the included results 316. In yet another example embodiment, each result 316 (or idea therewithin) can be associated with a complexity that indicates how information dense the result 316 (or idea) may be; where higher complexity indicates higher information density. With this approach, the complexities associated with the results 316 (or ideas) can influence the narrative size determination.

The chooser can determine the story size at step 602 according to any of a number of techniques.

For example, the story size can be a defined value that is coded into the chooser (e.g., a value of "1" for a chooser that seeks to generate the shortest possible narrative, a value of "5" for an intermediate length narrative, a value of "13" for even longer narratives, etc.). Moreover, this defined value can be a configurable operating parameter that a user may change to a desired value based on their needs in terms of desired narrative length.

In another example, step 602 can dynamically determine the story size. For example, the story size can be determined dynamically based on user feedback, where such user feedback can be explicit user feedback or implicit user feedback.

As an example of explicit user feedback, one or more users can provide feedback that explicitly indicates a given narrative on a topic was either too short ("tell me more") or too long ("this was too long"), and this feedback can be used to adjust the story size when the system 100 is later used to generate another narrative on that topic. The story size can be incrementally adjusted up or down based on such feedback in a learning mode until a story size is reached that consistently results in user feedback that indicates the adjusted story size is appropriate. While this approach would aim to adjust story size to fit the desires of a pool of users, the user feedback could also be used to dynamically define user-specific story sizes (e.g., User A likes story sizes of length X while User B likes story sizes of length Y). Moreover, such user-specific story sizes can be defined on a topic-specific basis if desired.

As an example of implicit user feedback, the system can monitor how users engage with the generated narratives and adjust story sizes based on this monitoring. For example, if this monitoring indicates that most users quickly scroll through a presented narrative (which indicates the user is just skimming the narrative), it can be inferred that that the narrative was too long, and the story size can be reduced. This type of user feedback can also be user-specific rather than more general to a pool of users. Thus, if User A is found to often skim through narratives, the story size can be reduced for that user until a story size is reached where the monitoring indicates the user is taking in the full narrative. Moreover, this implicit feedback can be defined on a user-specific and topic-specific basis so that if User A quickly scrolls through a narrative on topic X, the chooser can downwardly adjust the story size the next time that a narrative on topic X is generated for User A.

Another example of dynamic determination of story size can be the determination of story size based on analysis of the structured data. If an analysis of the structured data indicates that a particularly noteworthy condition exists (e.g., if the sales last week were the best ever for a company), then the chooser may increase the story size for the relevant topic (e.g., a "Track Sales for Last Week" topic).

As another example of dynamic story size determination, a practitioner can employ A/B testing to find an optimal story length for a user or organization (or other pool of users) to maximize usage of the system 100.

As still another example of dynamic story size determination, the chooser can dynamically determine the story size based on a complexity of the topic to be addressed by the narrative. The chooser can be configured to quantify a complexity for a given triggered topic, and this complexity can then be used to define the story size. For example, a practitioner may find it desirable to employ larger story sizes for more complex topics (and shorter story sizes for less complex topics). As an example, the chooser can assign a longer story size for a narrative that is to address some aspect of a best-fit line for Brazilian GDP over the years 2010-2020 than for a narrative that is to address a count of how many people are included in a particular sales team.

As still another example of dynamic story size determination, the story size can be dynamically defined or adjusted as the chooser decides which results 316 are worthy of being expressed in a narrative. The analytics 312 that are executed to produce the results 316 can also be configured to compute an importance value or an interestingness value for that result 316. The chooser can be configured to increase story size as some function of how interesting or important the results 316 are, which would have the effect of dynamically defining the story size based on the importance or interestingness of the results 316. For example, the chooser could require that a result 316 needs to have an importance value or interestingness value at or above some threshold to be included in the story graph 508, which would have the effect of dynamically defining the story size based on the structured data 112 itself (and narratives about interesting or important things will end up being longer than narratives about less interesting or important things).

The analytics 312 can be configured to compute values indicative of an importance or interestingness of each result 316. The importance and/or interestingness can be expressed as a score on some sale (e.g., a 1-10 scale, etc.) For example, results 316 that include large numbers can often be presumed to exhibit greater importance than results 316 that include smaller numbers. As another example, results 316 that include surprising or unexpected numbers can be presumed to exhibit more interestingness than numbers that are unsurprising/expected. Thus, your best salesperson can be deemed important; and your most improved salesperson can be deemed interesting. To support the assignment of importance values or interestingness values, the analytics can also support some level of historical comparative data analysis to assess whether results are larger or smaller than they typically are. In other circumstances where the analytics 312 produce a characterization of the data set, the nature of this characterization can influence the assessment of importance and/or interestingness. For example, a characterization of "Everyone got a little better" can be assigned a lower interestingness than a characterization of "One person improved dramatically". In another example embodiment, machine learning techniques can be used to compute importance and/or interestingness. For example, the system can collect user feedback about sentences or information in narratives that a user finds "not important", "important", "boring", "interesting" etc. (e.g., via user clicks through a UI), and the system can then learn how to derive importance and/or interestingness values from this collected user feedback based on similarities or other patterns between different narratives (e.g., the nodes that served as the basis for such narratives).

Further still, the determined size can have multiple size components, in which case there can be multiple size constraints operating on a given narrative. For example, there can be an overall story size as well as a subcomponent that defines a maximum size for "bad news" and/or "good news". To support these constraints, the results 316 can be generated along with accompanying metadata that characterizes a result 316 as "good" or "bad" (e.g., in some contexts, rising numbers can be deemed "good" and falling numbers can be deemed "bad"). The chooser can then implement these multiple size constraints when generating the story graph 508.

At step 604 of FIG. 6A, the chooser traverses the knowledge graph 110 based on the trigger 506, the determined size, and other criteria to choose one or more results 316 from one or more nodes 300 of the knowledge graph 110 for inclusion in the story graph 508. As indicated above, this traversal can continue until the determined story size has been reached, at which time the story graph 508 can be passed along to the structurer code 116 for content structuring.

Figure 6B:
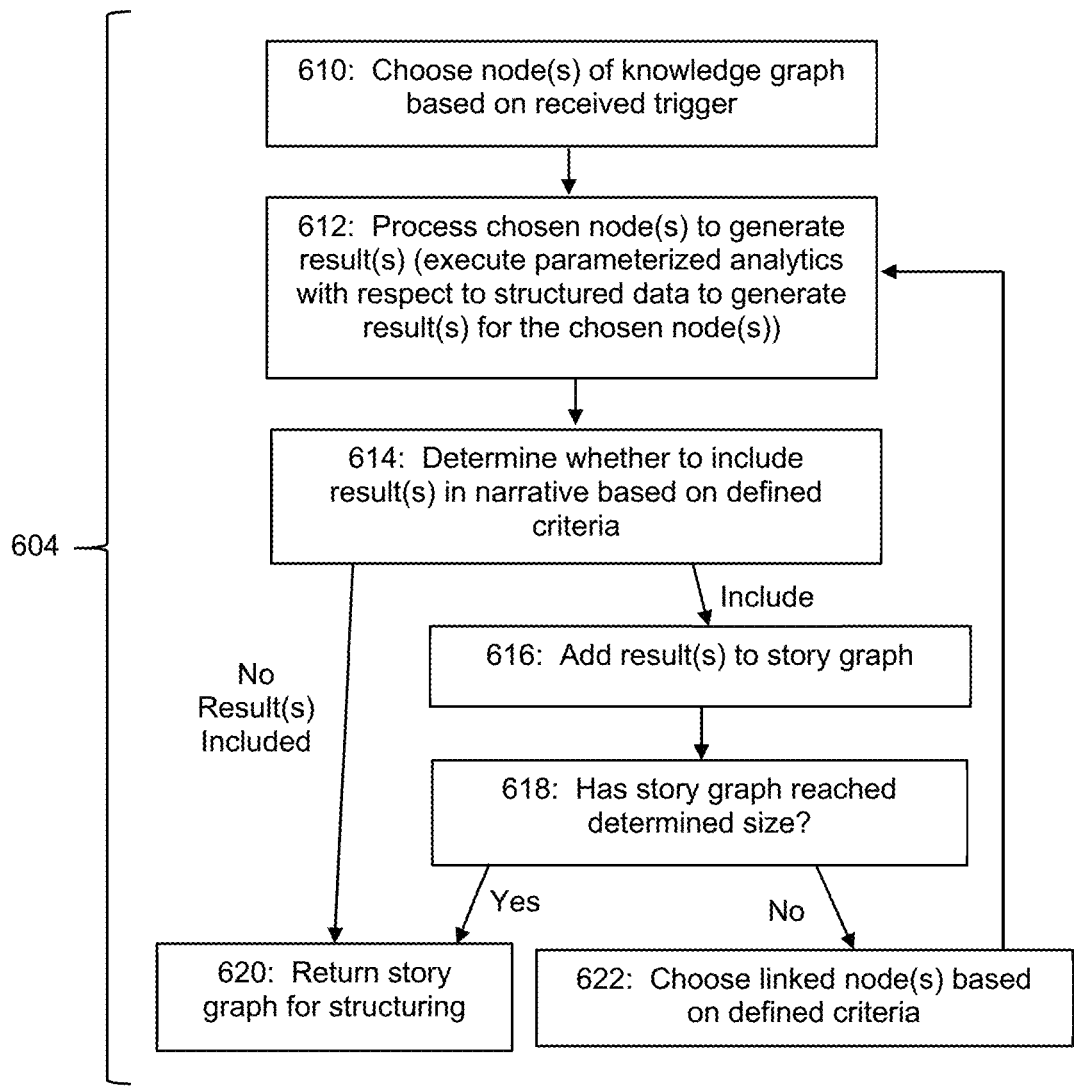

FIG. 6B depicts an example process flow for implementing step 604 of FIG. 6A. At step 610, the chooser 114 chooses a node 300 of the knowledge graph 110 based on the trigger 506 that had been received at step 600. As discussed above, this trigger 506 serves to point the system 100 at the primary topic to be addressed by the narrative to be generated. Thus, using techniques discussed above, the chooser 114 can resolve the received trigger 506 to a node 300 of the knowledge graph 110 that corresponds to the intent deemed to most closely correspond of the trigger 506. This chosen node can be referred to as the root node for narrative generation. In an example embodiment, step 610 resolves the trigger 506 to a single node 300 of the knowledge graph 110. However, it should be understood that this need not be the case as some practitioners may find it desirable to map some triggers to multiple nodes 300 (which are then to be chosen at step 610).

Steps 612 and 614 operate to evaluate the chosen node to determine whether its result 316 should be expressed in the narrative. At step 612, the chooser 114 processes the chosen node(s) to generate the result(s) 316 for the chosen node(s). This can be accomplished by executing the parameterized analytics 312 associated with the chosen node(s) against the structured data 112. The result(s) 316 can include quantifications and/or characterizations relating to the structured data 112 that are generated using techniques such as those described in U.S. Pat. Nos. 11,238,090, 10,963,649, 10,956, 656, 10,943,069, 10,853,583, 10,762,304, 10,755,042, 10,657,201, and 10,482,381 as well as U.S. patent application Ser. No. 16/183,270 (filed Nov. 7, 2018 and entitled "Applied Artificial Intelligence Technology for Narrative Generation Based on Explanation Communication Goals"), the entire disclosures of each of which are incorporated herein by reference.

As noted above, these result(s) 316 may include various metadata. For example, each result 316 may include metadata that indicates whether that result 316 constitutes "good news" or "bad news". As another example, each result 316 may include metadata that quantifies an importance and/or interestingness of that result 316 as discussed above.

At step 614, the chooser 114 determines whether to include the result(s) 316 from the chosen node(s) in the narrative that is to be generated. This determination can be made on the basis of defined criteria. The defined criteria can serve as selection criteria that controls which of the result(s) 316 to be expressed in the narrative. As an example, the results metadata can be used as selection criteria to determine whether a given result 316 should be expressed in the narrative. In this regard, an importance threshold and/or interestingness threshold can be defined, and if the importance and/or interestingness of the result 316 meets or exceeds the applicable threshold, then the chooser 114 can determine that the result 316 should be expressed in the narrative. Further still, the centrality of the node 300 that produced the result 316 can be used as selection criteria for inclusion. Thus, given that the root node is the most central node of the narrative generation process, the chooser 114 can be configured to always select the result 316 produced from the root node for inclusion in the narrative. Still other selection criteria may be employed if desired by a practitioner. For example, the chooser 114 can estimate the value of each result 316 to the user. User feedback on narratives can be collected where users provide indications of which results 316 expressed in a narrative provided value to them. This feedback can then train a model for use by the chooser 114, where the model predicts the circumstances under which such results 316 should be included in narratives in the future. As another example, the chooser 114 can use knowledge of what else the user knows to influence which results are selected for inclusion in the story graph 508. If a result 316 pertains to information that the system has already presented to the user previously in a given user session (or pertains to information that the system already presumes the user knows), then the chooser 114 may determine that such result 316 can be omitted from the story graph 508. For example, when mentioning a team, the chooser 114 can decide whether to identify the manager of the team based on whether the chooser 114 expects the audience for the narrative to already know who the manager is. If the audience is people on the subject team, the manager can be omitted as the chooser 114 can conclude that team members will already know their own manager. Similarly, if the audience is a user for whom the system already knows has recently consumed a previous narrative that identified the team manager, then the chooser 114 can conclude that the manager need not be re-identified.

If step 614 results in a determination that a result 316 is to be included in the narrative, then that result 316 is added to the story graph 508 at step 616 (and the size of the story graph 508 is updated). Next, at step 618, the chooser 114 compares the size of the story graph 508 with the story size that was determined at step 602. If the chooser 114 determines that the size of the story graph 508 has reached the determined story size, then the content determination phase 500 can be concluded, and the story graph 508 can be provided to the structurer 116 for content structuring (step 620).

However, if step 618 results in a determination that the size of the story graph 508 has not yet reached the determined story size, then the chooser 114 traverses the knowledge graph 110 and chooses one or more additional nodes 300 for evaluation. This serves as a content expansion phase of the FIG. 6B process flow. To further traverse the knowledge graph 110, the chooser 114 follows the link(s) 302 for the current node 300 and chooses one or more linked nodes at step 622 based on defined criteria; whereupon the chooser then recourses through steps 612, 614, 616, and 618, et seq. on the basis of the newly chosen node(s). The criteria used for choosing linked node(s) at step 622 can be referred to as expansion criteria for controlling which additional nodes of the knowledge graph 110 are to be evaluated. In an example embodiment, the primary expansion criteria can be the identification of the node(s) 300 identified by the link(s) 302 of the node(s) evaluated at step 612 and for which its result 316 was added to the story graph 508 at step 616. In this fashion, the chooser 114 can progressively consider expanding the narrative from content that has been selected for inclusion in the narrative.

The number of recursions through the knowledge graph 110 defines a search depth of the knowledge graph (wherein each recursion will explore another level of one or more nodes 300 that are linked to the previously evaluated node 300). The determined story size can serve as a primary basis that defines this search depth. However, it should be understood that the other expansion criteria as well as the extent of the knowledge graph 110 itself may also operate to limit the search depth.

It should be understood that multiple nodes 300 of the knowledge graph 110 may be chosen as linked nodes at step 622, in which case the chooser 114 may operate to evaluate each of these linked nodes at step 612 during the recursion process. The order in which these linked nodes are evaluated during the recursion(s) can be controlled in any of a number of ways. For example, as discussed below, the links 302 may include metadata, and the chooser 114 can use this link metadata to prioritize the order in which the chosen linked nodes should be evaluated.

It should also be understood that additional expansion criteria could be employed if desired by a practitioner, and these additional expansion criteria could have the effect of further filtering which nodes are chosen as the linked nodes chosen at step 622. For example, as mentioned above, the links 302 between nodes 300 can include metadata that annotates the nature of the relationship between the linked nodes. As an example, this metadata can identify a hierarchical nature of a given linkage (whether the linked node can be characterized as a "zoom-in" relative to the subject node or a "zoom-out" relative to the subject node). The chooser 114 can then prioritize whether the narrative will address higher level (zoom out) details or lower level (zoom in) details by excluding higher level or lower level nodes from the linked nodes chosen at step 622. As another example, this metadata can define a weight that indicates the strength of the linkage between two nodes. Step 622 may use such weights when deciding whether to choose a linked node. For example, the chooser 114 may require that a linked node chosen at step 622 have a weight above a defined threshold in order to be chosen. Such weights could also be used to defined a sort or rank order for the chosen linked nodes. This sort/rank order can also govern the order in which the chooser 114 evaluates the chosen linked nodes during step 612. In this fashion, if there is competition for space in the story graph 508 (based on the determined size), this sorting/ranking can help ensure that the most relevant results 316 have the best chance of being selected for inclusion in the narrative.

It can thus be understood that step 622 and the recursion of steps 612-620 has the effect of further expanding the scope of the narrative to topics that are deemed by the knowledge graph 110 to be directly related to the included result(s) 316, which leads to a cohesive narrative where the items of content selected for expression in the narrative build upon one another in an intelligible manner. This recursion process continues until the size of the story graph 508 has reached the determined story size (or until there are no more linked nodes to be chosen at step 622).

If step 614 results in a determination that no result(s) from the evaluated node(s) are to be expressed in the narrative, then the chooser 114 can proceed to step 620 and end the content determination phase 500. As noted above, the chooser 114 can be configured to always select the result(s) 316 from the root node(s) for inclusion in the story graph 508, so the chooser 114 can avoid an empty story graph 508. But, in this example configuration for step 604, it is possible that the story graph 508 will have a size less than the determined story size if the selection criteria from step 614 fails to select any of the result(s) 316 from the evaluated node(s) for inclusion in the story graph 508.

It should be understood that the process flow of FIG. 6B is an example of how step 604 could be implemented by the chooser 114. Some practitioners may employ a chooser 114 that carries out step 604 in a different manner. For example, while the process flow of FIG. 6B triggers nodes 300 to generate results 316 on an as-needed basis, an alternate implementation of step 604 can involve pre-computation of results 316 for the nodes 300 of the knowledge graph 110. In such a scenario, step 604 can focus on traversing the knowledge graph 110 to determine which results 316 should be included in the story graph 508 and step 612 need not be performed on an iterative basis. This pre-computation approach may have the effect of reducing the latency by which narratives are generated from the time that trigger 506 is received as the results 316 will have already been pre-computed for the knowledge graph 110. A practitioner may also find this approach suitable in use cases where it the underlying structured data 112 that drives the narrative generation is relatively static and not expected to change on a frequent basis.

FIGS. 7A-7H show how the process flow of FIG. 6B can operate for an example use case. In this example use case, the story size can be defined as a total of three results 316 for the story graph 508. FIG. 7A shows how the chooser can begin with a single node of the knowledge graph 110, which is labeled as R (for root node) in FIG. 7A. This node R is the node that the chooser locates as a result of step 610. The chooser will trigger node R to evaluate itself and generate its result. This evaluation can also reveal the nodes that are linked to node R by the knowledge graph (see FIG. 7B).

The chooser then decides whether to include the result from node R in the story graph 508. In this example, since node R is the root node, the chooser decided to include its result in the story graph 508 (denoted by the bolding of node R in FIG. 7C), and the size of the story graph 508 is updated to be 1 out of 3.

At this point, the chooser chooses additional linked nodes for evaluation as described above for step 622 of the FIG. 6B process flow. In this example, the linked nodes chosen for evaluation are nodes A, B, and C as shown by FIG. 7D. The chooser triggers nodes A, B, and C to generate their results and reveal their linked nodes. As shown by FIG. 7D, it can be seen that node A links to an additional three nodes, node B links to an additional two nodes, and node C does not link to any additional nodes.

The chooser next determines whether any of the results from nodes A, B, and C are to be added to the story graph using the techniques discussed above for step 614. This is shown by FIG. 7E; and in the case of FIG. 7E, the result from node A has been added to the story graph 508 (as denoted by the bolding of node A), while the results from nodes B and C were not added to the story graph 508. This means that the size of the story graph 508 is updated to be 2 out of 3.

The process flow can then recurse from node A, in which case nodes D, E, and F are triggered (see FIG. 7F) to produce their results and reveal their linkages. In this example, nodes D and E do not have any linked nodes, but node F links to two additional nodes.

The chooser then determines that the result from node F should be added to the story graph 508 (see FIG. 7G, where node F has been bolded), which means that the size of the story graph 508 has reached its limit. In this case, there is no need for the knowledge graph 110 to be further traversed, and a story graph 508 comprised of the results from nodes R, A, and F can be passed to the structurer 116 (see FIG. 7H).

With the approach of FIG. 6B, it can be seen that there will always be a direct linkage between the nodes that produce results included in the story graph 508. This prevents the inclusion of results 316 in the story graph 508 that might be deemed non-sequiturs because they do not directly flow from one node to the next. For example, the FIG. 6B process flow chose not to include the result from node B in the story graph 508. This means that any results from the two nodes to the right of and linked to node B (e.g., see FIG. 7G) would not be included in the story graph because the results from those nodes may not make much sense without also expressing the result from node B. However, some practitioners may find it desirable to allow for the possibility of digging deeper into the knowledge graph 110 to find results 316 that are to be expressed in the narrative. For example, perhaps it may be the case that one of the nodes linked and to the right of node B produces a highly important or interesting result. In this situation (presuming the story size permits), the chooser can be configured to select this result for inclusion in the story graph, in which case the result from node B could be effectively retroactively added to the story graph 508 to backfill the narrative with sufficient connective material.

FIG. 7I provides a visual indication of the nodes of the knowledge graph 110 that are closely connected to the nodes that produced results included in the story graph 508. In this regard, nodes B, C, D, and E were evaluated during the choosing process but their results were not selected for inclusion in the story graph 508. Moreover, nodes G and H are directly linked to node F, but were not evaluated because the story size had been reached. Due to their direct connections with nodes R, A, and F (whose results are to be expressed in the narrative), the inventors notes that nodes B, C, D, E, G, and H represent highly relevant topics for potential follow-ups that the user might be interesting in reviewing. For example, the results produced by nodes B, C, D, E, G, and H represent information that the system 100 reasonably could have included in the narrative but chose not to.

To further provide users with access to additional relevant information, the chooser 114 (or other code executed by the system 100) can be configured to provide users with an ability to access information that expresses the results 316 from any or all of these nodes. This can be accomplished in any of a number of ways. For example, a user interface that presents the natural language narrative generated by the system 100 can include one or more links that can be selected by a user to access one or more narratives that are derived from one of more of the results 316 from any of the nodes B, C, D, E, G, and H. These links can be presented as follow-up questions that the user may select if they are interested in getting the answer to such a follow-up question. As another example, the user interface that presents the natural language narrative generated by the system 100 can be configured to respond to "hovering" over specific text portions in the narrative by presenting additional information relating to that text portion. Thus, if a given portion of the narrative text is expressing the result from node A, then the user action of hovering over that text portion can cause the user interface to also display a narrative that expressed the results from nodes D and/or E. Similarly, if another portion of the narrative text is expressing the result from node F, then the user action of hovering over that text portion can cause the user interface to also display a narrative that expressed the results from nodes G and/or H. As another example, the follow-up information can be presented to users in response to user engagement of a scroll feature with respect to a presented natural language narrative. In this fashion, a user action of scrolling a screen beyond the end of a natural language narrative (or beyond the end of a portion of a natural language narrative) can cause the system 100 to present the follow-up information that is linked to the nodes from which the end or end portion of the subject natural language narrative was generated.

Thus, it can be understood that the traversal of the knowledge graph 110 by the chooser 114 can also reveal nodes of the knowledge graph 110 which can serve as sources for additional information that the user may want to read after reading the generated natural language narrative.

Moreover, any new metrics produced for expression in the narrative can then be available to the system for use as a basis for the follow-up information. For example, a "Track Bookings" narrative may state that "Bookings were up 10% week-over-week . . . ". In this scenario, "Week-Over-Week Change in Bookings" could then be a metric that the user can select to generate a "Track Week-Over-Week Change in Bookings" narrative.

FIG. 8 depicts an example process flow for execution by the system 100 (e.g., by the chooser 114) to provide users with access to additional information that is relevant to the content presented by a given natural language narrative. At step 800, the system determines additional information relative to the natural language narrative that the user may be interested in reading. As noted above, this can be accomplished by identifying the nodes of the knowledge graph that are directly linked to nodes that produced results selected for inclusion in the narrative. If there are multiple nodes that are directly linked to the expressed nodes, the system can employ any of number of techniques to order and/or prioritize how users can be provided with access to follow-up information via these nodes. For example, the link metadata discussed above can be used to decide on which linked nodes will serve as higher priority follow-up items. As another example, the system can track user interactions with the system to determine which follow-up items are most popular with users when consuming different narratives. The more a given follow-up item is selected by users, the system can assign the nodes corresponding to such follow-up items a higher ranking for the follow-up process of FIG. 8.

At step 802, the system provides the user with access to the determined additional information via a user interface. As mentioned above, this can be accomplished using techniques such as user-selectable links (where such links can be phrased in terms of follow-up questions indicative of the intents corresponding to the nodes from which the additional information may be derived) or user-interactive text in the natural language narrative itself (e.g., the hovering feature discussed above).

At step 804, the system receives user input which corresponds to a request for additional information. For example, this can be a user-selection of a follow-up link or a user hover over a specific portion of the natural language narrative. This system can respond to this request by presenting the requested additional information via the user interface (step 806). This can be accomplished by triggering the node that corresponds to the requested additional information to generate its result 316 (if that result was not already generated during the FIG. 6B process flow) and then generating a narrative that expresses such result 316, where this generated narrative is presented to the user via the user interface.

Moreover, knowledge of which nodes 300 of the knowledge graph 110 would serve as good candidates for follow-ups can permit the system to seed the process of extracting an appropriate meaning from a user's input in a conversational interaction. For example, consider a case where the user has been presented with a "Track Bookings" narrative and the user input at step 804 is a follow-up question expressed as "What about new pipeline?". In general, resolving a question such as that to the proper intent is a hard problem. But, if the system already knows from the links 302 that a good follow-up to "Track Bookings" is "Track New Pipeline", then the system can more readily resolve the user input to the correct intent.

Figure 9A:
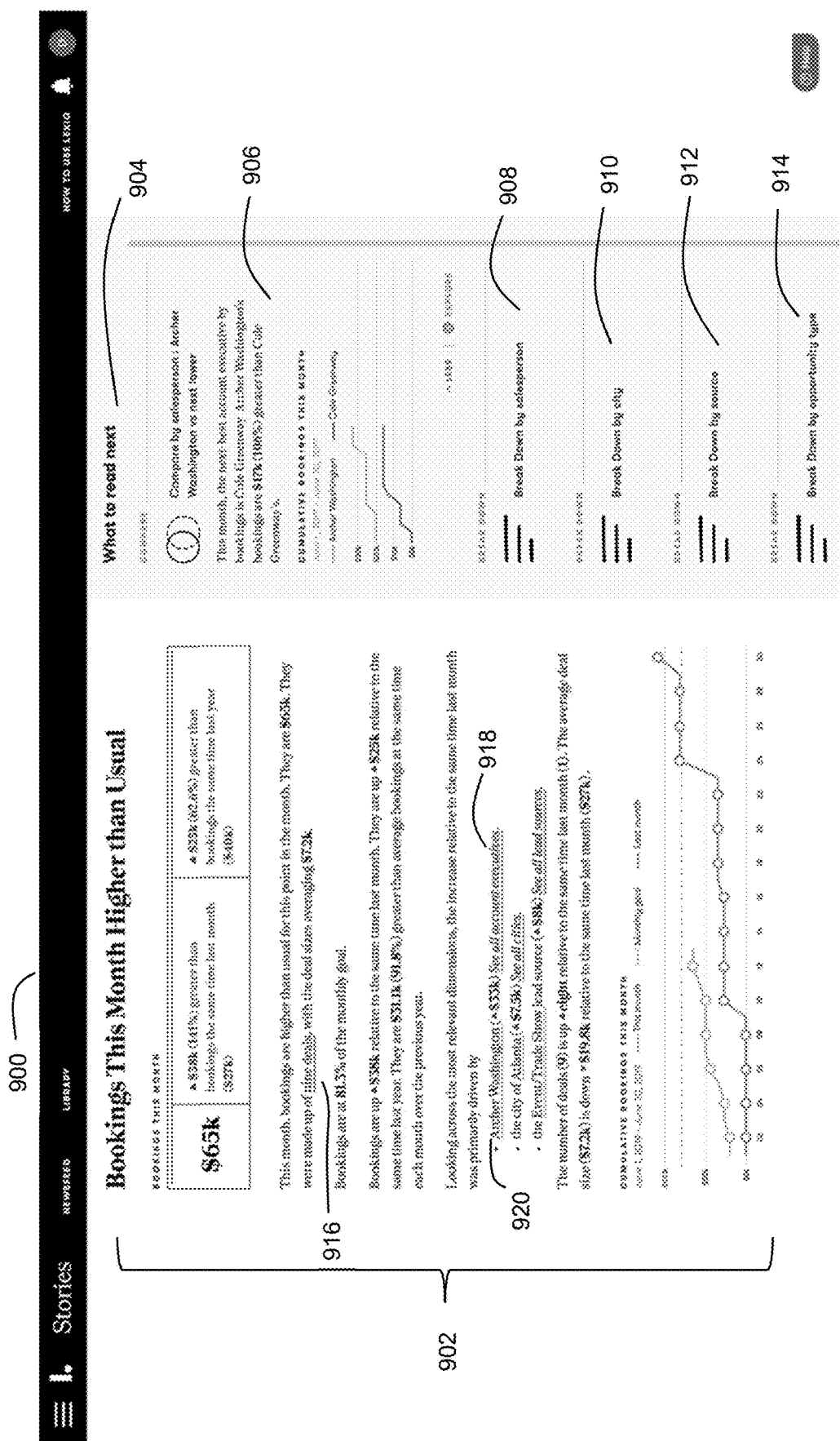
FIGS. 9A and 9B show examples of user interfaces through which narratives can be presented to a user along with access to follow-up information.

FIG. 9A depicts an example graphical user interface (GUI) 900 through which a narrative can be presented to a user along with one or more follow-up links for accessing additional information in accordance with the process flow of FIG. 8. FIG. 9A shows several examples of how such additional information can be made available to users. GUI 900 includes a section 902 that presents the generated natural language narrative. GUI 900 also includes a section 904 that provides the user with access to additional information related to the narrative in section 902. For example, display portion 906 shows content corresponding to a Compare intent that the system had deemed related to the main narrative in section 902. Display portions 908, 910, 912, and 914 show selectable links in the form of icons/cards that correspond to different Breakdown intents that the system had deemed related to the main narrative in section 902.

Further still, the main narrative in section 902 also includes selectable links (e.g., see underlined story portions such as those indicated by 916, 918, and 920), where user selection of these links can cause the GUI 900 to display additional information derived from the nodes 300 that produced the content corresponding to those links. Such additional information can be derived from linked nodes that were not included in the story graph 508 from which the narrative was generated. Moreover, it should be understood that user selection of any of the links 908-920 can trigger the system to generate an entirely new natural language narrative for presentation to the user (in which case the linked follow-up node can serve as the root node of a new narrative).

Figure 9B:
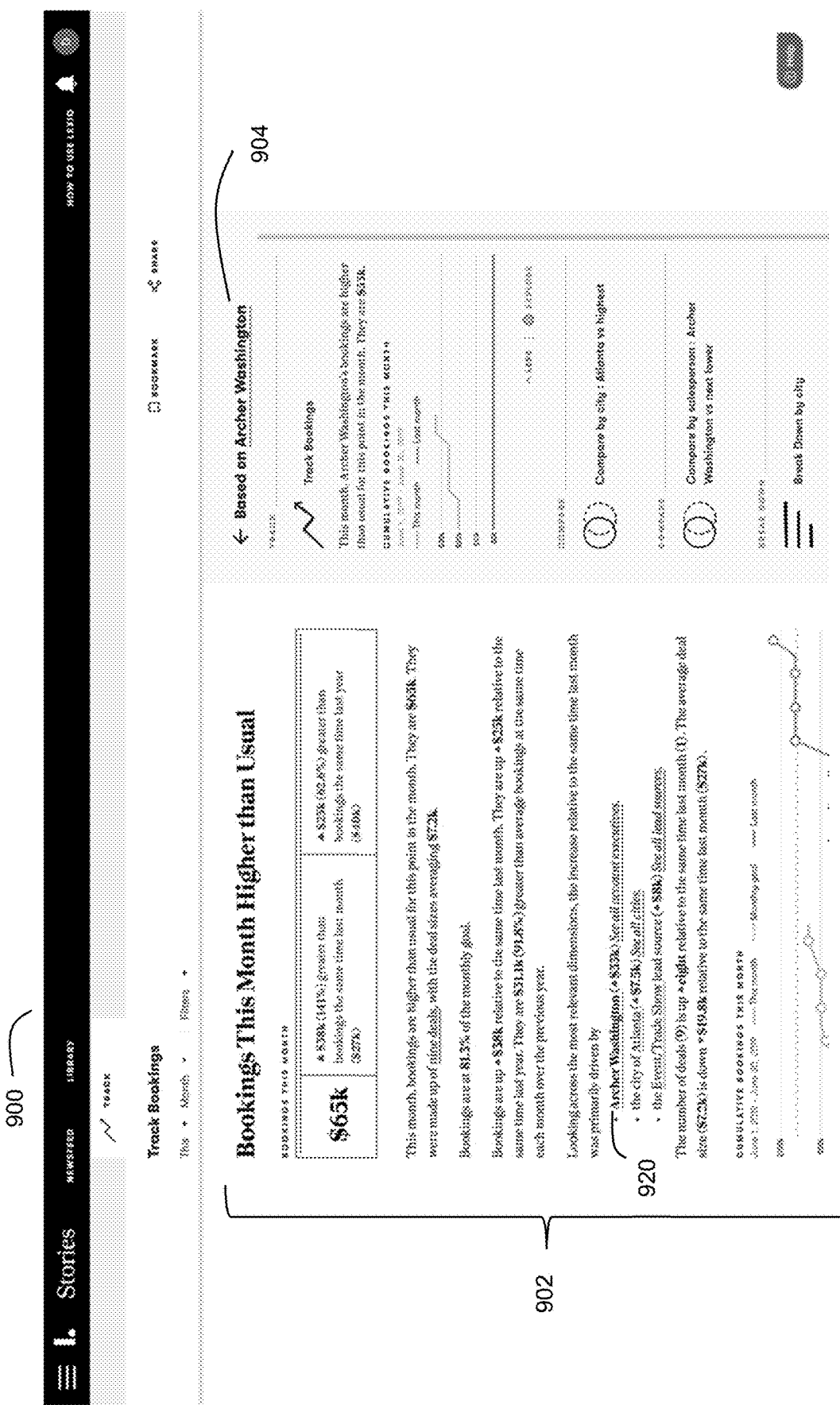

FIG. 9B shows how the GUI 900 could be updated in response to user selection of one of the follow-up links. In this example, the user has selected link 920 of FIG. 9A to indicate an interest in accessing additional information about bookings by Archer Washington. User selection of link 920 can cause section 904 to re-populate with follow-ups that are specific to the subject of the selected link 920 (Archer Washington this example), as shown by FIG. 9B. Thus, while section 904 in FIG. 9A includes follow-ups that are generally relating to the narrative in section 902; section 904 in FIG. 9B includes follow-ups that are more focused on a particular topic.

Figure 10A:
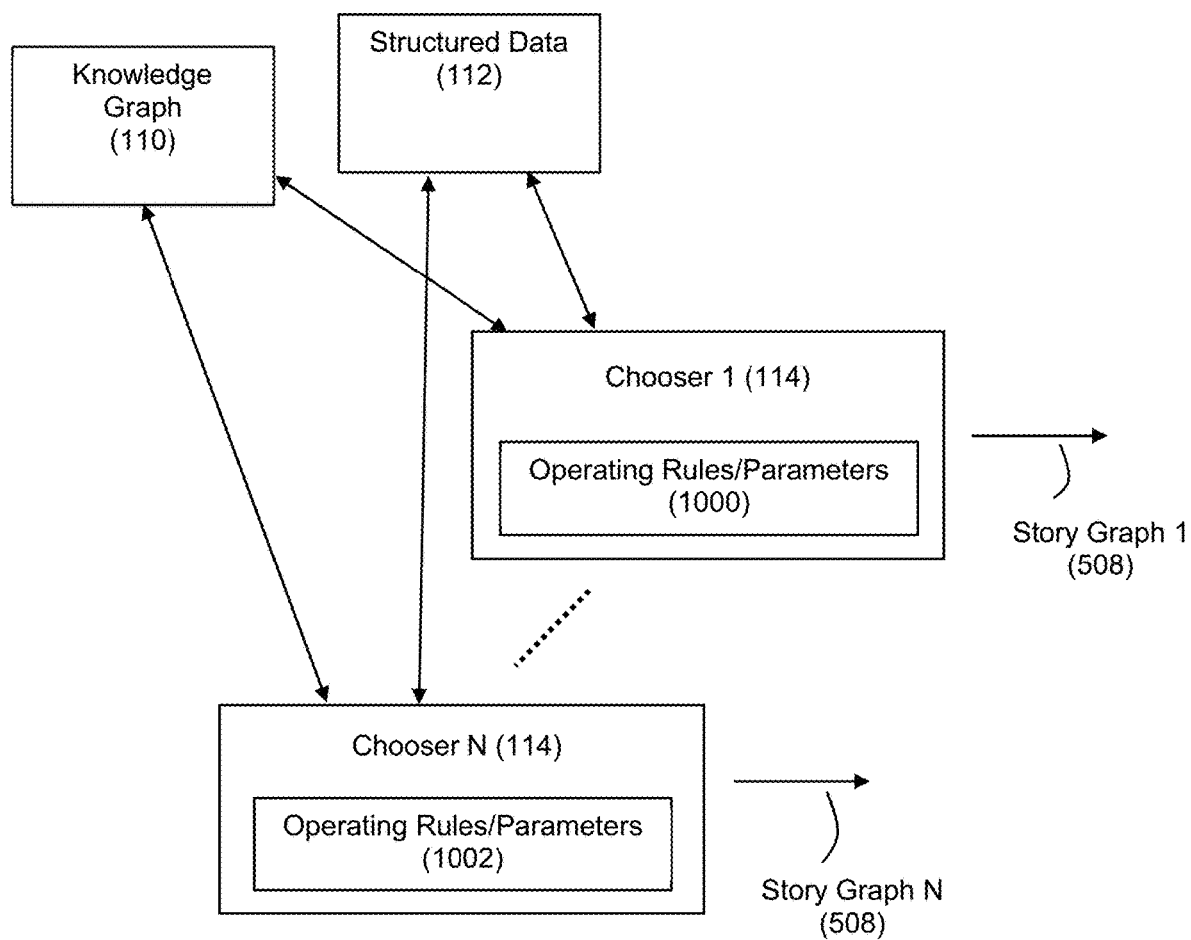
FIG. 10A shows an example where multiple choosers interact with a knowledge graph to generate different types of story graphs.
Figure 10B:
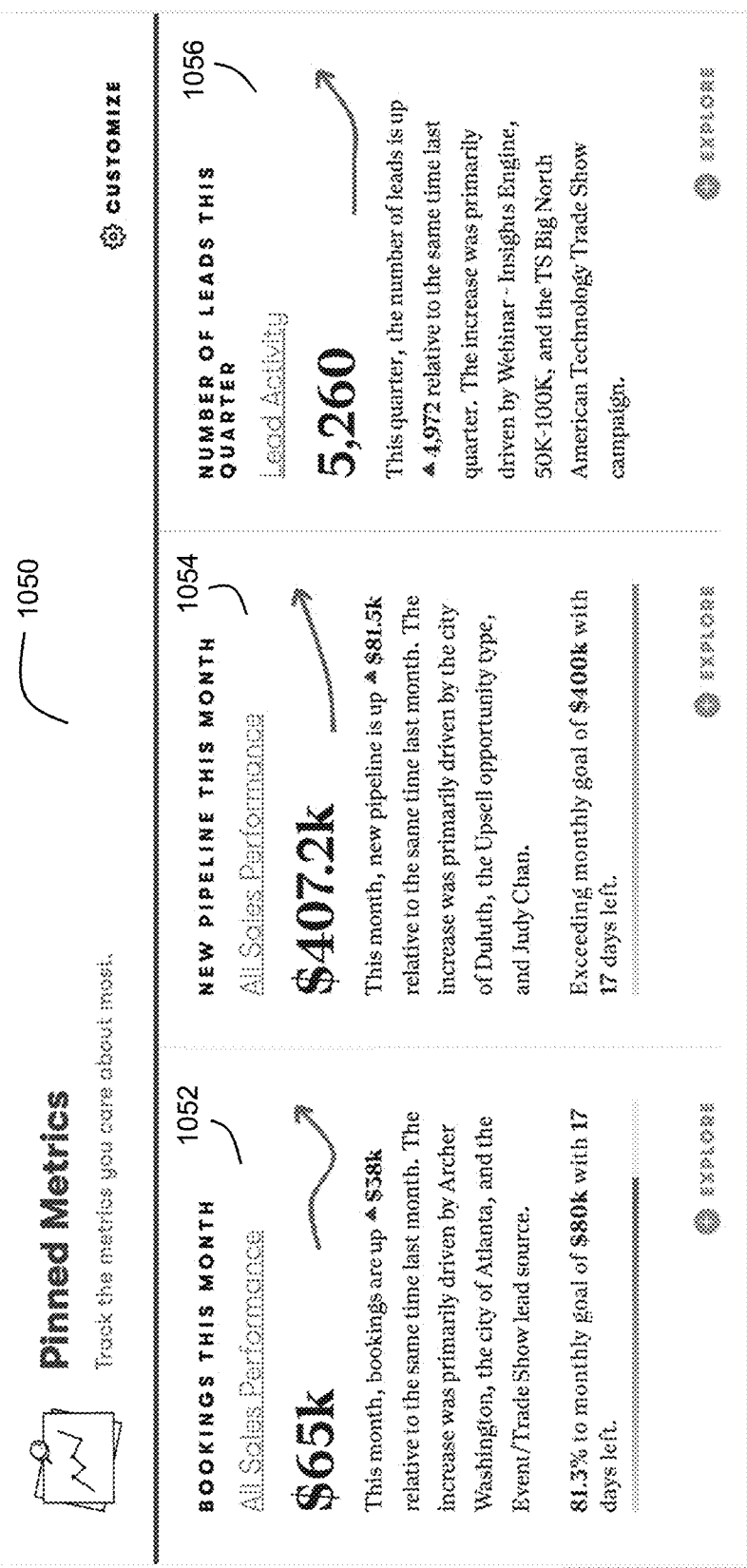
FIG. 10B shows an example user interface that presents narratives that were produced using a chooser that is configured to determine content for a "summary card" story.

FIG. 10A shows how the system 100 can accommodate the use of multiple choosers 114 to generate story graphs 508. In this fashion, different choosers 114 can operate using different rules and/or parameters 1000, 1002 that govern how they traverse the knowledge graph 110 and add results 316 to their respective story graphs 508. The choosers 114 can implement different strategies for creating story graphs 508. For example, Chooser 1 can be configured to generate "full" stories, in which case the operating parameter(s) 1000 it uses to determine story size can be configured to define a size sufficient to produce a "full" stories (e.g., a narrative that expresses 10 or more results 316). FIGS. 9A and 9B show an example of a narrative in section 902 that could be produced using such a "full story" chooser. As another example, Chooser N can be configured to generate "short" stories that can serve as summary cards or blurbs of information presented to users, in which case the operating parameter(s) 1002 it uses to determine story size can be configured to define a relatively short story that is sufficient for purposes of the summary card or blurb (e.g., a narrative that expresses between 1 and 5 results 316). FIG. 10B shows an example GUI 1050 that presents narratives 1052, 1054, and 1056 produced using such a "summary card" chooser. In this example, narrative 1052 shows a short version of a "Track Bookings" story (as compared with the longer version shown by FIGS. 9A and 9B). Furthermore, in this example, users can select the "explore" links to access longer versions of the narratives and/or follow-up information about the narratives. As yet another example, another Chooser (say Chooser i) can be configured to generate stories that focus on "good" news (or "bad" news or some other desired classification). This can be accomplished through a definition of operating rules for the chooser that are effective to prioritize the selection of results that express "good" results (or "bad" results, or other classes of results as the case may be). As mentioned above, the results 316 produced by the nodes 300 can include metadata that characterizes the corresponding results as expressing good news, bad news, or other characterizable features; and this metadata can be used by the chooser as the selection criteria for determining whether to add a given result 316 to the story graph 508. Such metadata can be derived from the ontology 120 or other sources which can include information that identifies whether values corresponding to "up", "down", "larger", "smaller", etc. constitute positive or negative qualities.

Accordingly, it should be understood that the system 100 is capable of employing multiple choosers 114 concurrently that will operate to generate different story graphs 508 for presentation of different narratives to different users.

Moreover, the chooser(s) 114 can work as plug-in(s) which can be swapped in and out of the system 100 depending on the needs of different users. This plug-in capability can also permit third party developers to design their own choosers 114 that work with the knowledge graph 110 (and/or authoring graph 108) to generate narratives about data sets.

Some users may prefer choosers 114 that are highly rigid in their operations so that the system 100 will generate very consistent narratives over time. However, other users may want more configurability for the chooser 114. In such a case, the rules and/or operating parameters (see 1000, 1002 of FIG. 10A) of a given chooser 114 can be configurable by a user to control how the chooser 114 traverses the knowledge graph 110 and generates story graphs 508. Thus, if a user has a need for longer narratives with greater depth, the user can adjust the operating parameter(s) of the chooser 114 so that a larger story size will be employed. Similarly, the configurable operating rules and/or parameters can govern the selection criteria and/or expansion criteria used by the chooser 114 when deciding which results 316 to express in a narrative and how to traverse across the knowledge graph 110 to additional linked nodes for evaluation.

The rules and/or operating parameters 1000, 1002 of a chooser 114 can also be responsive to user feedback to adjust how it will determine which results 316 should be expressed in a narrative. For example, the system 100 can collect feedback from users about particular elements of a narrative (e.g., thumbs up or down for different portions of a narrative), where this feedback is mapped to the results 316 and nodes 300 of the knowledge graph that were the basis for expressing that portion of the narrative. Such feedback can adjust weighting that the chooser 114 may use in deciding which results 316 to express in a narrative to cause the chooser 114 to be more likely (or less likely) to express that type of result 316 in future narratives.

Desired operating rules and/or operating parameters 1000, 1002 for given users can be stored in or derived from user profiles for the users. Moreover, the user feedback can serve as training data that trains the chooser 114 as to how it should operate for different users. In this fashion, the system 100 can support user-specific choosers 114 that determine the content for inclusion in natural language narratives in a manner that is tailored to different users. For example, the chooser 114 can be configured to "focus on" the user. As an example, the chooser 114 could weight results more heavily if they talk about the user or members of the user's team. In this regard, if User A requests a narrative based on a "Track" root node with respect to tracking bookings, then User A could be presented with a narrative that includes a sentence about the User A's bookings (while User B who requests the same story would get a narrative that includes a sentence about User B's bookings).

Figure 11:
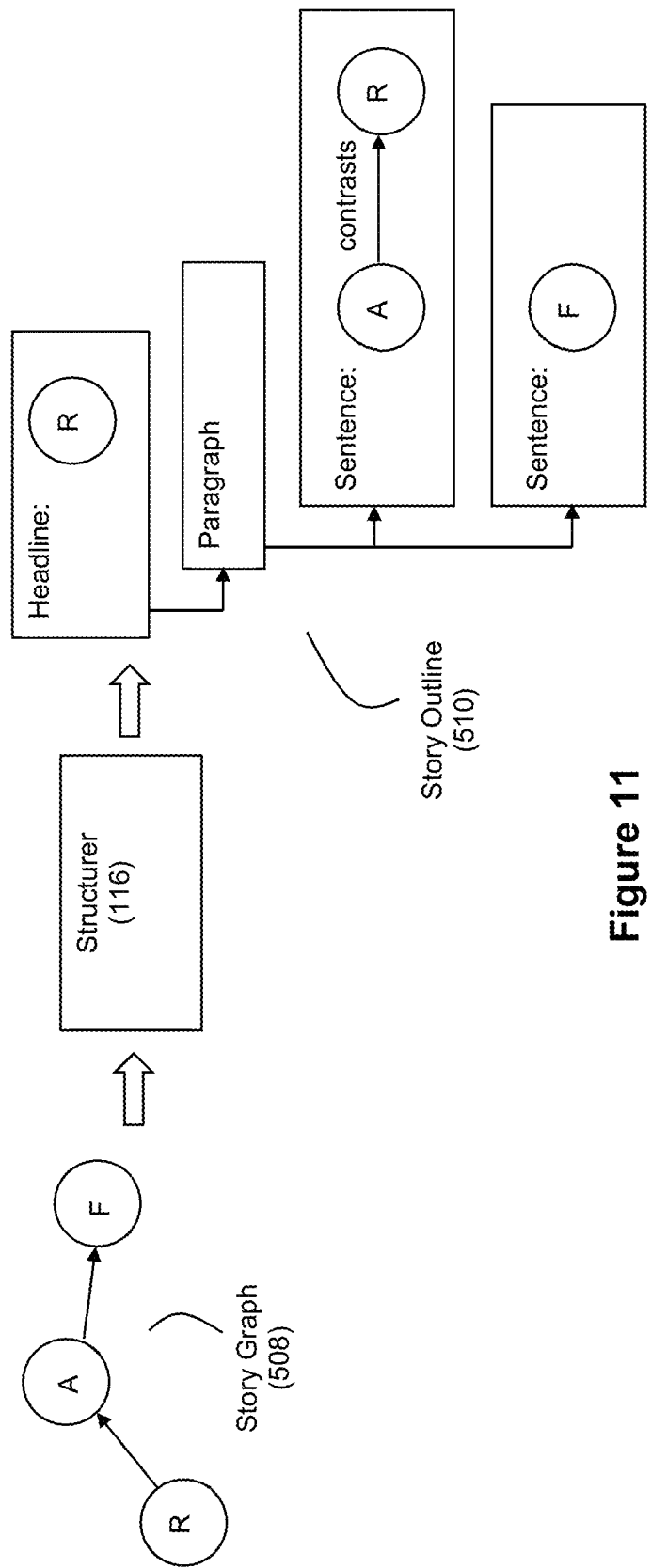
FIG. 11 shows an example of how a structurer can structure results from a story graph into a story outline.

FIG. 11 shows an example of how the structurer code 116 can organize the results 316 from the story graph 508 into a story outline 510. For example, the structurer 116 can include logic that selects which of the results 316 should be used for expressing a headline or title of the narrative. This can be performed on the basis of criteria such as importance and/or interestingness values tied to the results 316 (e.g., the result 316 with the highest importance and/or interestingness is selected for the headline), which of the results 316 was produced by the root node (e.g., the result 316 from the root node is selected for the headline), etc. The structurer 116 can also include logic that groups results 316 into paragraphs and/or sentences. For example, if the knowledge graph 110 links Node A with Nodes B and C, while Node B is linked with Nodes D and E, while Node C is linked with Nodes F and G (and where the results 316 from these nodes are all included in the story graph 508), the structurer 116 can group the results 316 from Nodes B, D, and E together in the same paragraph, while the results 316 from Nodes C, F, and G are grouped together in another paragraph. This is just an example, and it should be understood that the grouping logic can vary to accommodate any of a number of different scenarios. Further still, the structurer 116 can use link metadata which characterizes the nature of the relationship between linked nodes to determine how the story outline can segueway from one result to another. For example, if the link relationship indicates a contrasting relationship exists between two linked nodes, this can be flagged in the story outline 510 (which can lead to narratives that use phrases such as "but" or "however" to segueway between the results 316 from those nodes).

In a circumstance where a given node 300 included in a story graph 508 has multiple in-pointing links 302 (e.g., for the story graph, Nodes A, B, and C point to Node D), the structurer 116 can then decide where the Node D content should be expressed in the narrative. The structurer 116 can also use the presence of such multiple in-pointing links as guidance that a reference back to a fact should be included later in a narrative.

FIG. 11 shows an example where the story graph 508 of RAF is converted into a story outline 510 where the result from node R is used for the headline, and the first paragraph includes two sentences, where (1) a first sentence combines with results from nodes A node R (where there is a contrasting relationship between these results) and (2) a second sentence is to express the result from node F.

Figure 12:
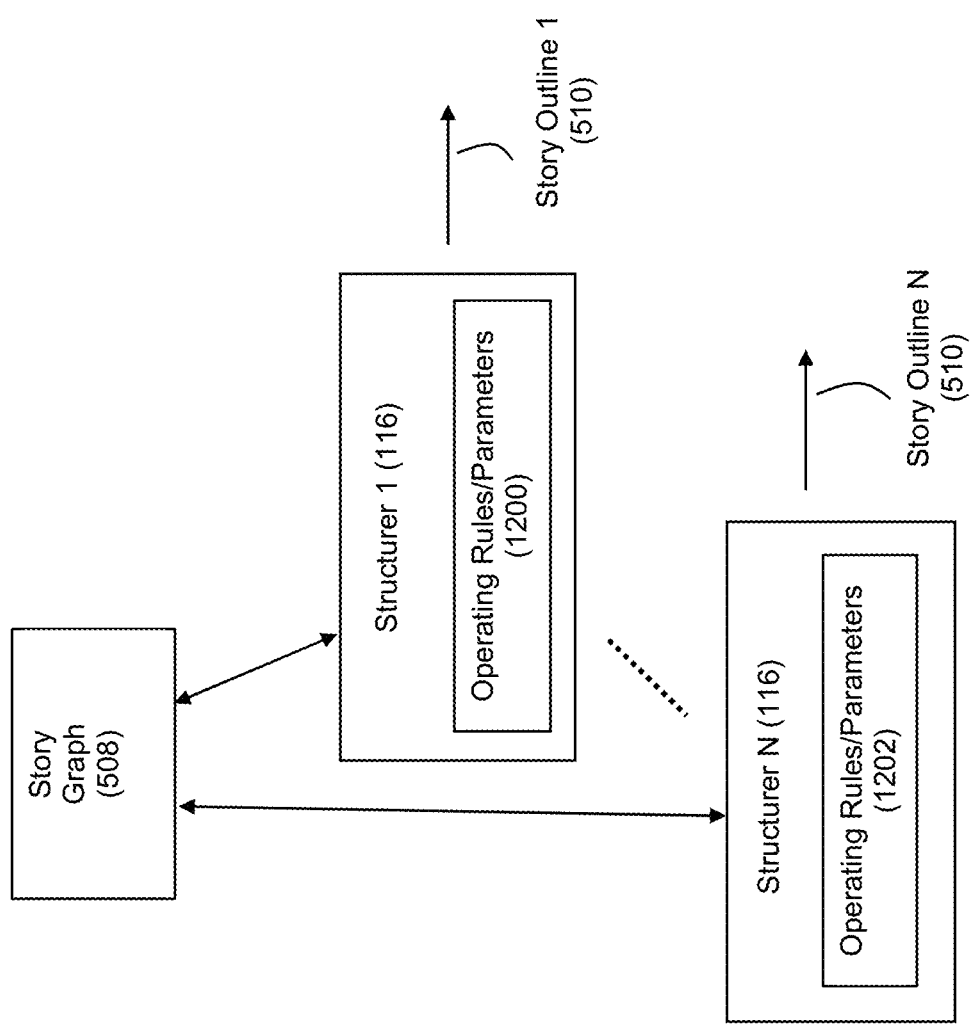
FIG. 12 shows an example where multiple structurers interact with story graphs to generate different types of story outlines.

As with choosers 114, the system 100 can accommodate the use of multiple structurers 116 to generate story outlines 510 from story graphs 508, as shown by FIG. 12. In this fashion, different structurers 116 can operate using different rules and/or parameters 1200, 1202 that govern how they traverse organize the results 316 from the story graph 508 into a story outline 510. In this fashion, the structurers 116 can employ strategies that align with the strategies used by the chooser 114 which generated the story graph 508 that the structurer 116 is to work on. Thus, if a "full story" chooser 114 was used to generate the subject story graph 508, a structurer 116 that is configured to generate outlines for such "full" story graphs 508 can be used to generate the outline 510. Similarly, if a "summary card" chooser 114 was used to generate the subject story graph 508, a structurer 116 that is configured to generate outlines for such "summary card" story graphs 508 can be used to generate the outline 510. With reference to the example of FIG. 10B, it can be seen that the summary card narratives shown thereby exhibit a highly consistent structure (number-chart-period-over-period-drivers-goal), and this structure can be controlled by the structurer 116 that was used to convert the story graphs 508 for those narratives into the story outlines 510 from which those narratives were generated.

As such, it should be understood that the system 100 is capable of employing multiple structurers 116 concurrently that will operate to generate different story outlines 510 for presentation of different narratives to different users.

Moreover, like the chooser(s) 114, the structurer(s) 116 can work as plug-in(s) which can be swapped in and out of the system 100 depending on the needs of different users. This plug-in capability can also permit third party developers to design their own structurers 116 that work with story graphs 508 to generate story outlines 510.

Furthermore, the rules and operating parameters (see 1200, 1202 of FIG. 12) of a given structurer 116 can be configurable by a user to control how the structurer 116 organizes results 316 in the story outline 510. Thus, for a user who desires the narratives to exhibit a fairly consistent structure across multiple narratives (e.g., see the consistent structure for the narratives of FIG. 10B discussed above), the operating rules/parameters 1200, 1202 can employ a rigid set of rules for slotting the results 316 into the outline 510. For another user who wants the narratives to express the most interesting, surprising, and/or interesting results first, the structurer 116 can employ rules that achieve this purpose.

Once the story outline 510 has been generated, the realizer code 118 can perform NLG on the story outline 510 with the aid of ontology 120 to generate the natural language narrative 512. Any of a number of NLG techniques that operate on story outlines can be used to implement this realization phase 504. Examples of NLG techniques that can be used by the realizer code 118 to generate natural language narratives 512 from story outlines are described in U.S. Pat. Nos. 10,956,656, 10,943,069, 10,755,042, and 10,657,201, the entire disclosures of each of which are incorporated herein by reference.

While the invention has been described above in relation to its example embodiments, various modifications may be made thereto that still fall within the invention's scope.

For example, while the examples of results 316 discussed above for nodes 300 involve content that gets expressed as natural language text in the narrative, it should be understood that one or more of the nodes 300 of the knowledge graph 110 can serve to generate results 316 that are expressed visually in a narrative (e.g., as a graph, chart, table, etc.). Examples of such graphs and charts that can be produced from such nodes 300 are shown by FIGS. 9A and 9B. As a further example, user selection of the "nine deals" link 916 in FIG. 9A could cause the system to process the relevant node 300 and produce a table presenting information about those nine deals. Such nodes 300 that have results 316 to be expressed visually in a non-language manner can be referred to as visual nodes 300. Logic or metadata associated with nodes 200 of the authoring graph 108 can control whether a parameterization of such node 200 into a knowledge graph node 300 should be a visual node (or not).

As another example, it should be understood that the trigger process relating to steps 600 and 610 of FIGS. 6A and 6B can work in concert with the story triggering techniques described in U.S. Pat. Nos. 10,482,381 and 10,956,656, the entire disclosures of each of which are incorporated herein by reference. In this fashion, the chooser 114 can also evaluate the result 316 of the root node to determine if it is sufficiently important and/or interesting to merit the generation of a narrative about it. If the result 316 for the root node has an importance or interestingness that falls below some defined threshold, then the chooser 114 can choose not to express that result 316, which would effectively cause story graph 508 to be empty, in which case no narrative would be produced. With an approach such as this, the system can be configured to trigger a "Track Yesterday" request each day for one or more metrics and a defined threshold for importance and/or interestingness. If any of the results 316 for such requests satisfy the importance and/or interestingness threshold, then the system would generate the suitable narrative about it. But if not, no narrative would be generated. In this fashion, the system can be in a state of regularly processing the structured data 112 to look for important and/or interesting content and then surface such content to users via narratives when warranted.

These and other modifications to example embodiments the invention described herein will be recognizable upon review of the teachings herein.

What is claimed is:

1. A method comprising:
receiving via a communication interface a request to generate a natural language narrative of a structured data set;
determining a plurality of result values by executing analytics computations on the structured data set via a processor;
determining via the processor a story graph corresponding with the structured data set, the story graph including a plurality of nodes corresponding with respective items of content determined based on the result values;
determining a story outline based on the story graph via the processor, wherein determining the story outline comprises executing a plurality of code elements on the story graph, the plurality of code elements corresponding with a plurality of structurers defining different operating rules and/or parameters implementing different strategies for organizing the items of content from the story graph into the story outline based at least in part on linkages between the plurality of nodes;
generating a natural language narrative for the structured data set based on the story outline; and
transmitting the natural language narrative via the communication interface in a response to the request.

2. The method recited in claim 1, wherein the operating rules and/or parameters for at least one of the structurers organizes the items of content into the story outline based on importance values assigned to the items of content.

3. The method recited in claim 1, wherein the plurality of nodes are related in the story graph via a plurality of links, wherein the links include metadata that describe relationships between the linked nodes, and wherein the operating rules and/or parameters for at least one of the structurers organize the items of content into a story outline based on the links metadata.

4. The method recited in claim 1, the method further comprising:
selecting the plurality of structurers from among a larger set of structurers.

5. The method recited in claim 1, wherein the operating rules and/or parameters for at least one of the structurers organizes the items of content into a story outline based on a user profile and/or training data associated with a user to whom a natural language narrative is to be presented.

6. The method recited in claim 1, wherein the story graph is parameterized based on the structured data to define a knowledge graph, the knowledge graph is traversed to determine content for expression in the natural language narratives.

7. The method recited in claim 1, the method further comprising:
generating the natural language narrative based on the story graph in an interactive mode based on conversational inputs from users.

8. One or more non-transitory computer readable media having instructions stored thereon for performing a method, the method comprising:
receiving via a communication interface a request to generate a natural language narrative of a structured data set;
determining a plurality of result values by executing analytics computations on the structured data set via a processor;
determining via the processor a story graph corresponding with the structured data set, the story graph including a plurality of nodes corresponding with respective items of content determined based on the result values;
determining a story outline based on the story graph via the processor, wherein determining the story outline comprises executing a plurality of code elements on the story graph, the plurality of code elements corresponding with a plurality of structurers defining different operating rules and/or parameters implementing different strategies for organizing the items of content from the story graph into the story outline based at least in part on linkages between the plurality of nodes;
generating a natural language narrative for the structured data set based on the story outline; and
transmitting the natural language narrative via the communication interface in a response to the request.

9. The one or more non-transitory computer readable media recited in claim 8, wherein the operating rules and/or parameters for at least one of the structurers organizes the items of content into the story outline based on importance values assigned to the items of content.

10. The one or more non-transitory computer readable media recited in claim 8, wherein the plurality of nodes are related in the story graph via a plurality of links, wherein the links include metadata that describe relationships between the linked nodes, and wherein the operating rules and/or parameters for at least one of the structurers organize the items of content into a story outline based on the links metadata.

11. The one or more non-transitory computer readable media recited in claim 8, the method further comprising:
selecting the plurality of structurers from among a larger set of structurers.

12. The one or more non-transitory computer readable media recited in claim 8, wherein the operating rules and/or parameters for at least one of the structurers organizes the items of content into a story outline based on a user profile and/or training data associated with a user to whom a natural language narrative is to be presented.

13. The one or more non-transitory computer readable media recited in claim 8, wherein the story graph is parameterized based on the structured data to define a knowledge graph, the knowledge graph is traversed to determine content for expression in the natural language narratives.

14. The one or more non-transitory computer readable media recited in claim 8, the method further comprising:
generating the natural language narrative based on the story graph in an interactive mode based on conversational inputs from users.

15. A system comprising:
a communication interface operable to receive a request to generate a natural language narrative of a structured data set;
a storage system operable to store a plurality of result values determined by executing analytics computations on the structured data set;
a processor operable to:
determine a story graph corresponding with the structured data set, the story graph including a plurality of nodes corresponding with respective items of content determined based on the result values;
determine a story outline based on the story graph, wherein determining the story outline comprises executing a plurality of code elements on the story graph, the plurality of code elements corresponding with a plurality of structurers defining different operating rules and/or parameters implementing different strategies for organizing the items of content from the story graph into the story outline based at least in part on linkages between the plurality of nodes;

generate a natural language narrative for the structured data set based on the story outline, wherein the natural language narrative is transmitted via the communication interface in a response to the request.

16. The system recited in claim 15, wherein the operating rules and/or parameters for at least one of the structurers organizes the items of content into the story outline based on importance values assigned to the items of content.

17. The system recited in claim 15, wherein the plurality of nodes are related in the story graph via a plurality of links, wherein the links include metadata that describe relationships between the linked nodes, and wherein the operating rules and/or parameters for at least one of the structurers organize the items of content into a story outline based on the links metadata.

18. The system recited in claim 15, the method further comprising:

selecting the plurality of structurers from among a larger set of structurers.

19. The system recited in claim 15, wherein the operating rules and/or parameters for at least one of the structurers organizes the items of content into a story outline based on a user profile and/or training data associated with a user to whom a natural language narrative is to be presented.

20. The system recited in claim 15, wherein the story graph is parameterized based on the structured data to define a knowledge graph, the knowledge graph is traversed to determine content for expression in the natural language narratives.

* * * * *